(12) United States Patent
Gutman et al.

(10) Patent No.: US 11,916,851 B2
(45) Date of Patent: Feb. 27, 2024

(54) DYNAMIC AUTOMATIC GAIN CONTROL (AGC) REFERENCE SIGNALING

(71) Applicant: QUALCOMM INCORPORATED, San Diego, CA (US)

(72) Inventors: Igor Gutman, Hod HaSharon (IL); Navid Abedini, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 160 days.

(21) Appl. No.: 17/559,044

(22) Filed: Dec. 22, 2021

(65) Prior Publication Data

US 2023/0198730 A1 Jun. 22, 2023

(51) Int. Cl.
*H04L 5/14* (2006.01)
*H04L 5/00* (2006.01)
*H04L 5/16* (2006.01)

(52) U.S. Cl.
CPC .......... *H04L 5/1461* (2013.01); *H04L 5/0005* (2013.01); *H04L 5/0051* (2013.01); *H04L 5/0053* (2013.01); *H04L 5/16* (2013.01)

(58) Field of Classification Search
None
See application file for complete search history.

(56) References Cited

U.S. PATENT DOCUMENTS

| | | | | | |
|---|---|---|---|---|---|
| 8,565,358 | B2* | 10/2013 | Komaili | ............... | H03G 3/3089 375/349 |
| 2004/0242174 | A1* | 12/2004 | Kim | ................... | H04W 52/226 455/136 |
| 2008/0089443 | A1* | 4/2008 | Sanada | ............... | H04L 27/2675 375/319 |
| 2019/0059078 | A1* | 2/2019 | Noh | ....................... | H04W 28/20 |
| 2020/0091971 | A1* | 3/2020 | Dehghan | ............. | H04B 7/0691 |
| 2020/0145918 | A1* | 5/2020 | Ji | ...................... | H04W 52/0229 |
| 2020/0169995 | A1* | 5/2020 | Nam | .................... | H04W 72/21 |
| 2020/0195342 | A1* | 6/2020 | Rapaport | ............. | H04B 10/114 |
| 2020/0295914 | A1* | 9/2020 | Hormis | ................. | H04W 72/23 |
| 2021/0067307 | A1* | 3/2021 | Kim | ....................... | H04W 72/23 |
| 2021/0258923 | A1* | 8/2021 | Kakishima | .......... | H04W 56/005 |

FOREIGN PATENT DOCUMENTS

| | | |
|---|---|---|
| EP | 3910826 A1 | 11/2021 |
| WO | 2020186440 A1 | 9/2020 |

OTHER PUBLICATIONS

International Search Report and Written Opinion—PCT/US2022/051593—ISA/EPO—dated Apr. 18, 2023.

\* cited by examiner

*Primary Examiner* — Otis L Thompson, Jr.
(74) *Attorney, Agent, or Firm* — QUALCOMM Incorporated

(57) ABSTRACT

Schemes, mechanisms, and devices for automatic gain control (AGC) signaling are provided. According to one aspect of the present disclosure, a method of wireless communication performed by a user equipment (UE) includes: receiving, from a base station (BS), a signal indicating an automatic gain control (AGC) reference signal resource, wherein the AGC reference signal resource includes at least a first symbol of a slot associated with a scheduled downlink (DL) communication; receiving, from the BS, the scheduled DL communication in the slot, wherein the scheduled DL communication includes an AGC reference signal in the AGC reference signal resource; and performing, based on the AGC reference signal, AGC for the scheduled DL communication.

29 Claims, 12 Drawing Sheets

DYNAMIC AUTOMATIC GAIN CONTROL (AGC) REFERENCE SIGNALING

FIELD OF TECHNOLOGY

The following relates generally to wireless communications and more specifically to the use of reference signals for automatic gain control (AGC).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices (e.g., user equipment (UE)).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum.

Conventionally, the signals in the uplink (UL, or reverse link) and the signals in the downlink (DL or forward link) are transmitted either in different frequency hands (e.g., by frequency domain duplexing (FDD)) or in the same frequency band but in different time slots (e.g., by time domain duplexing (TDD)). This method of separating UL and DL transmissions is referred to as half duplex (HD) communication. The separation of the signals in either frequency or time domain eliminates the possibility of a strong transmit signal of a user to drown a weak signal received by that same user. Recently, with technological improvements to interference cancellation techniques, true radio level full duplex communication is feasible, where bi-directional communication between devices occurs utilizing a single frequency channel, and at the same time. As the demand for mobile broadband access continues to increase, research and development continue to advance wireless communication technologies not only to meet the growing demand for mobile broadband access, but to advance and enhance the user experience.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

According to one aspect of the present disclosure, a method of wireless communication performed by a user equipment (UE) includes: receiving, from a base station (BS), a signal indicating an automatic gain control (AGC) reference signal resource, wherein the AGC reference signal resource includes at least a first symbol of a slot associated with a scheduled downlink (DL) communication; receiving, from the BS, the scheduled DL communication in the slot, wherein the scheduled DL communication includes an AGC reference signal in the AGC reference signal resource; and performing, based on the AGC reference signal, AGC for the scheduled DL communication.

According to another aspect of the present disclosure, a method for wireless communication performed by a base station (BS) includes: transmitting, to a user equipment (UE), a signal indicating an automatic gain control (AGC) reference signal resource, wherein the AGC reference signal resource includes at least a first symbol of a slot associated with a scheduled uplink (UL) communication; receiving, from the UE, the scheduled UL communication in the slot, wherein the scheduled UL communication includes an AGC reference signal in the AGC reference signal resource; and performing, based on the AGC reference signal, AGC for the scheduled UL communication.

According to another aspect of the present disclosure, a user equipment (UE) includes: a transceiver; and a processor in communication with the transceiver such that the transceiver and the processor are configured to: receive, from a base station (BS), a signal indicating an automatic gain control (AGC) reference signal resource, wherein the AGC reference signal resource includes at least a first symbol of a slot associated with a scheduled downlink (DL) communication; receive, from the BS, the scheduled DL communication in the slot, wherein the scheduled DL communication includes an AGC reference signal in the AGC reference signal resource; and perform, based on the AGC reference signal, AGC for the scheduled DL communication.

According to another aspect of the present disclosure, a base station (BS) includes: a transceiver; and a processor in communication with the transceiver such that the transceiver and the processor are configured to: transmit, to a user equipment (UE), a signal indicating an automatic gain control (AGC) reference signal resource, wherein the AGC reference signal resource includes at least a first symbol of a slot associated with a scheduled uplink (UL) communication; receive, from the UE, the scheduled UL communication in the slot, wherein the scheduled UL communication includes an AGC reference signal in the AGC reference signal resource; and perform, based on the AGC reference signal, AGC for the scheduled UL communication.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
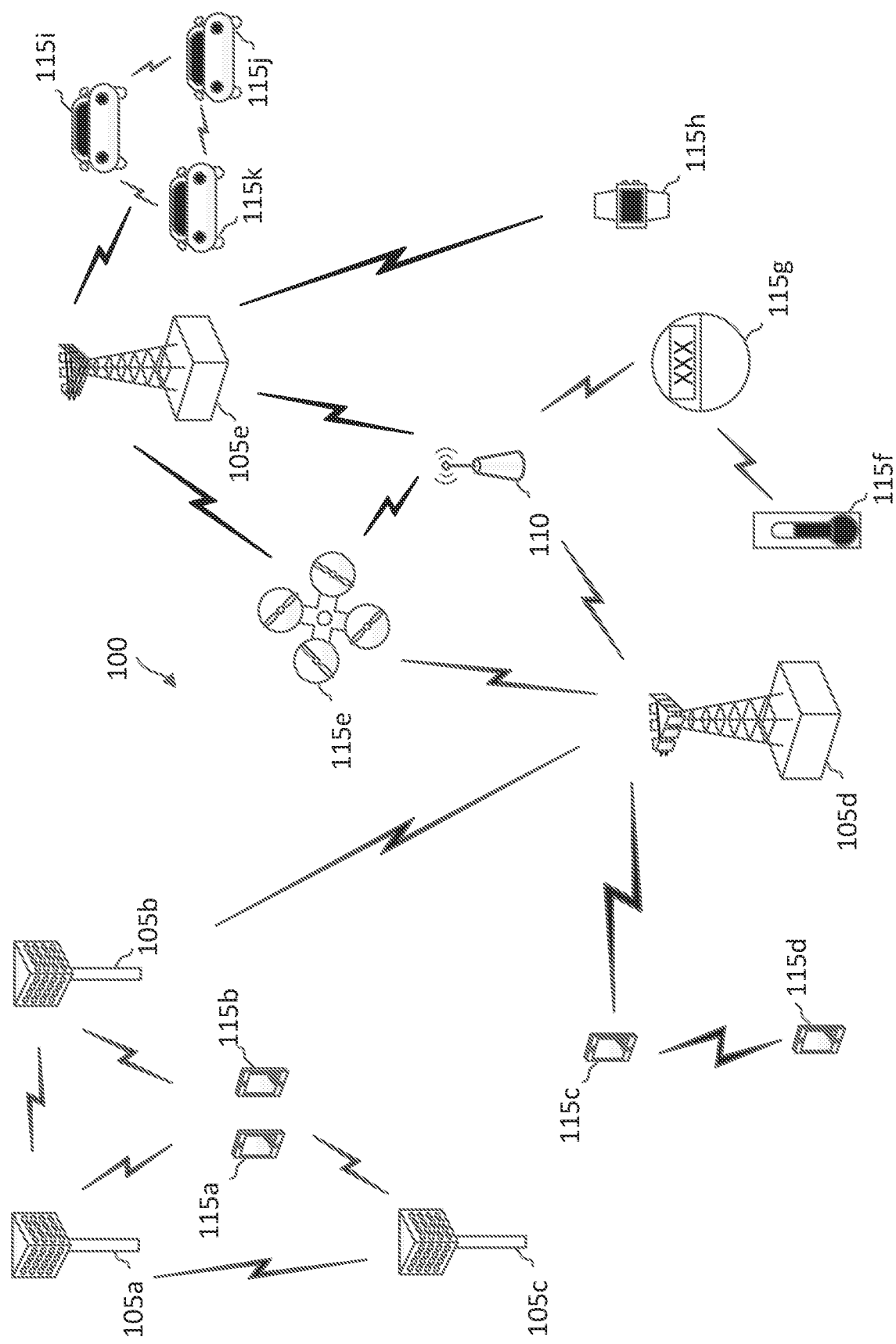
FIG. 1 illustrates a wireless communication network, according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW. In some aspects, 5G NR may be described as operating in two frequency ranges: FR1, which includes frequency bands of about 7 GHz and lower (e.g., 410 MHz to 7125 MHz), and FR2, which includes frequency bands between about 24.25 GHz and about 52.6 GHz, which may be referred to as the mmWave.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

As mentioned above, wireless communication devices may use a duplexing scheme to separate DL and UL communications. Duplexing schemes includes FDD (DL/UL communications on different frequency bands), TDD (DL/UL communications in different time windows), or half duplexing (DL/UL communications separated in frequency and time.) Recently, with technological improvements to interference cancellation techniques, true radio level full duplex (FD) communication is feasible, where bi-directional communication between devices occurs utilizing a single frequency channel, and at the same time. The benefits of FD communications include reducing latency and increasing throughput. For example, the simultaneous DL/UL communication capabilities may reduce the potential DL/UL contention, and therefore reduce communication latency, especially in asymmetric links. Further, FD communications may allow for throughput to be increased without necessarily changing the modulation coding scheme (MCS). For example, in FR2 and FR2+ frequencies, it may be challenging or impractical to meet the signal to noise ratio (SNR) criteria to use a higher-throughput MCS, such as 4096QAM. Thus, FD communications may increase data throughput by a factor of two even using a same MCS as compared to FDD or TDD communication schemes.

There are challenges associated with FD communications. Once challenge for FD communications is managing and reducing interference, either from the same node (self-interference) or from a different node (cross interference). Interference, whether in FD communications, FDD communications, or TDD communications, can be managed or mitigated using beam management techniques, antenna isolation, and/or analog/digital interference cancellation. Self-interference is particularly challenging to manage for FD communications. Further, device mobility may create additional challenges for FD interference management techniques, such as digital/analog cancelation (e.g., digital interference cancellation (DIC)). For example, automatic gain control (AGC) may be employed by a wireless communication device, such as a BS or a UE, to dynamically adjust a received signal gain to account for variations in signal strength over time due to varying inter-device distances and/or varying characteristics of the communication medium. Proper AGC settings (e.g., gain states) may facilitate proper cancelation/reduction of interference. On the other hand, incorrect AGC settings may degrade interference cancellation techniques.

In some instances, the AGC can be implemented through the mechanism of two loops: an outer loop and an inner loop. The outer loop may control the low-noise amplifier (LNA) gain state in RF (i.e., by increasing or decreasing amplifier gain). The LNA gain state can compensate for coarse gain variations. In contrast, the inner loop may estimate and adjust the digital variable gain control (DVGA) to maintain a constant set-point for the signal power at the input to the demodulator. In a relatively static environment, the receiving antenna may use the AGC settings that are predicted and used by the LNA to account for variations in signal strength. If the gain settings/states are within a suitable range such that the output of the LNA is not saturated and is above the noise floor, the wireless communication device may use digital interference cancellation (DIC), for example, to account for self-interference and/or cross-interference. However, in a more dynamic environment, more volatile signal power variations may cause saturation of the LNA. If the LNA is saturated, the ability of the wireless communication to use digital/analog cancellation for interference may be hindered, the sub-band full duplex (SBFD) orthogonality may be limited, and unwanted bias to reference signal strength indicator (RSSI)/reference signal received power (RSRP) measurements may be introduced. In other words, current techniques for AGC may not be able to address rapid variations in signal power fast enough to prevent LNA saturation. The LNA saturation may, in turn, reduce the ability of the wireless communication device to account for signal interference using DIC, for example.

The present disclosure provides schemes and mechanisms to facilitate AGC gain state selection in FD communications using dedicated reference signaling. In some aspects, a wireless communication device may be configured with a dedicated reference signal (RS) resource associated with a FD communication. The wireless communication device may be triggered or instructed to activate the dedicated RS when a FD communication is scheduled in a slot. The dedicated RS resource may include a first symbol of the slot to allow rapid updates of gain states and/or gain settings for AGC. For example, rapid updates may include updates to the gain state or other AGC settings that can be formed on an intra-slot level. For example, the dedicated RS in the first symbol of the slot may be used to update a LNA gain state used to digitally sample the remaining symbols of the slot. The dedicated RS may be a duplication of the following (second) symbol, or a different signal based on a known pilot, similar or identical to RSs used for RSSI, RSRP, and/or SNR calculations. The dedicated RS may occupy one, two, three, or any other suitable number of symbols. In some aspects, the dedicated RS may be referred to as a AGC-RS. In some aspects, the AGC-RS resource may be semi-statically configured by radio resource control (RRC) signaling and/or media access control (MAC) information elements (IEs). In other aspects, the AGC-RS resource may be dynamically activated using control layer signaling (e.g., downlink control information (DCI)). In some aspects, the AGC-RS resource may be configured using broadcast signaling (e.g., physical broadcast channel (PBCH)).

The dedicated RS may be triggered or activated based on one or more criteria. For example, in some aspects, the dedicated RS may be triggered or activated based on a MCS, rank, SNR, and/or CQI reports. In other aspects, the dedicated RS may be triggered or activated based on a mobility of the wireless communication device.

The wireless communication device may perform AGC based on the dedicated RS. For example, the wireless communication device may use the dedicated RS in the outer loop of the AGC described above. The dedicated RS may be used instead of or in addition to SSBs, tracking reference signals (TRS), and/or physical downlink shared channel (PDSCH) resources. The techniques and mechanisms described herein may be employed by a BS, a UE, and/or any other wireless node. For example, a BS may configure a dedicated RS resource for UE AGC, and/or may request the UE to transmit a RS that can be used by the BS for AGC.

The AGC techniques of the present disclosure may provide an updated LNA gain state that may increase the chance that signals in a dynamic environment can be properly decoded. Accordingly, the mechanisms and devices described herein advantageously increase data throughput and reduce communication failures in dynamic environments. Thus, the user experience may be improved. These advantages may be particularly noticeable for FD communications that may experience self-interference in some environments.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmit multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information —reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for DL communication.

In some aspects, the network 100 may be a NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may support full duplex (FD), half duplex (HD), and or any other type of duplexed communications to increase data throughput.

Figure 2:
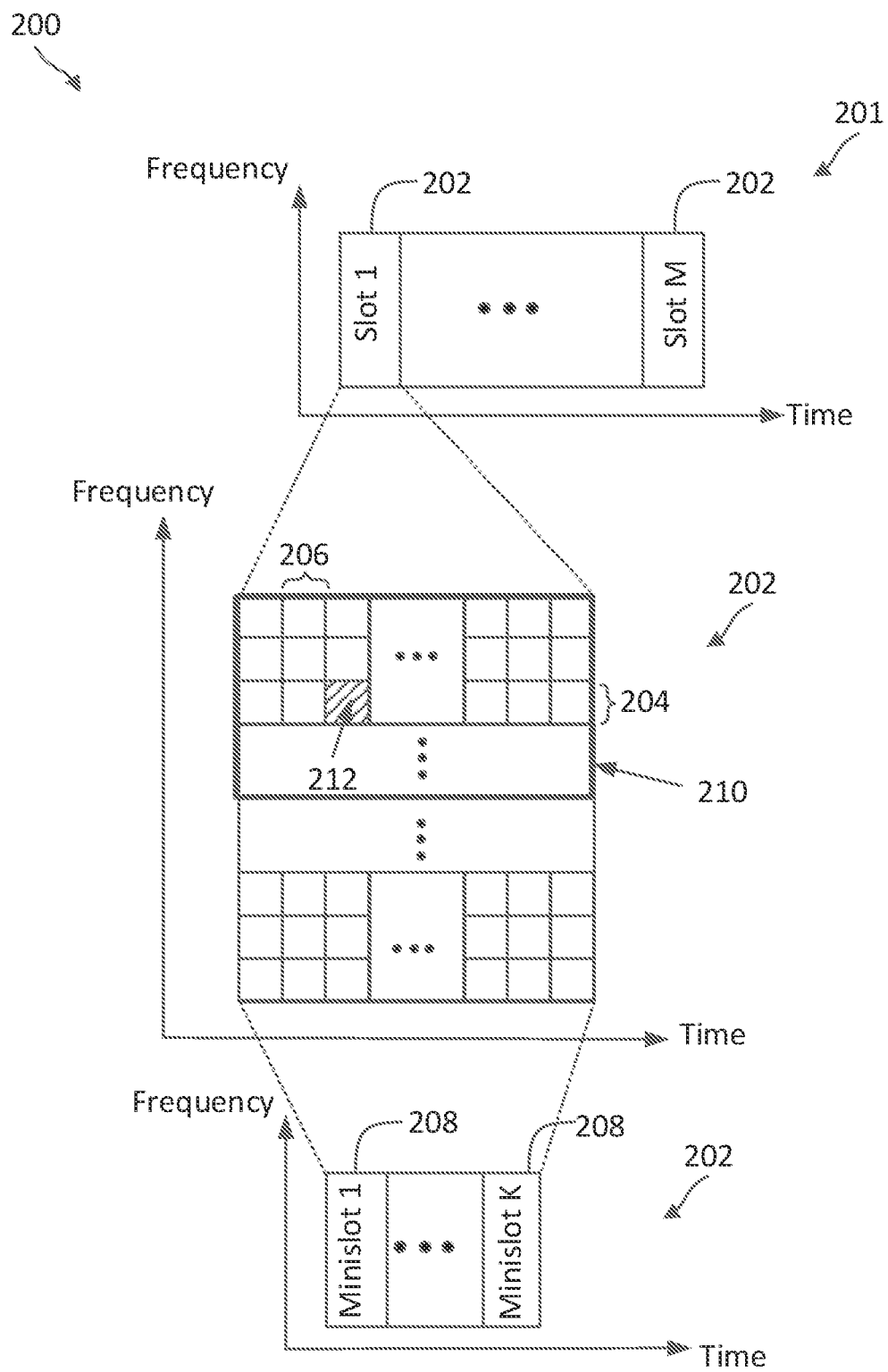
FIG. 2 illustrates a radio frame structure, according to some aspects of the present disclosure.

FIG. 2 illustrates a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The transmission frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel BW, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In an example, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N-1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204).

Figure 3:
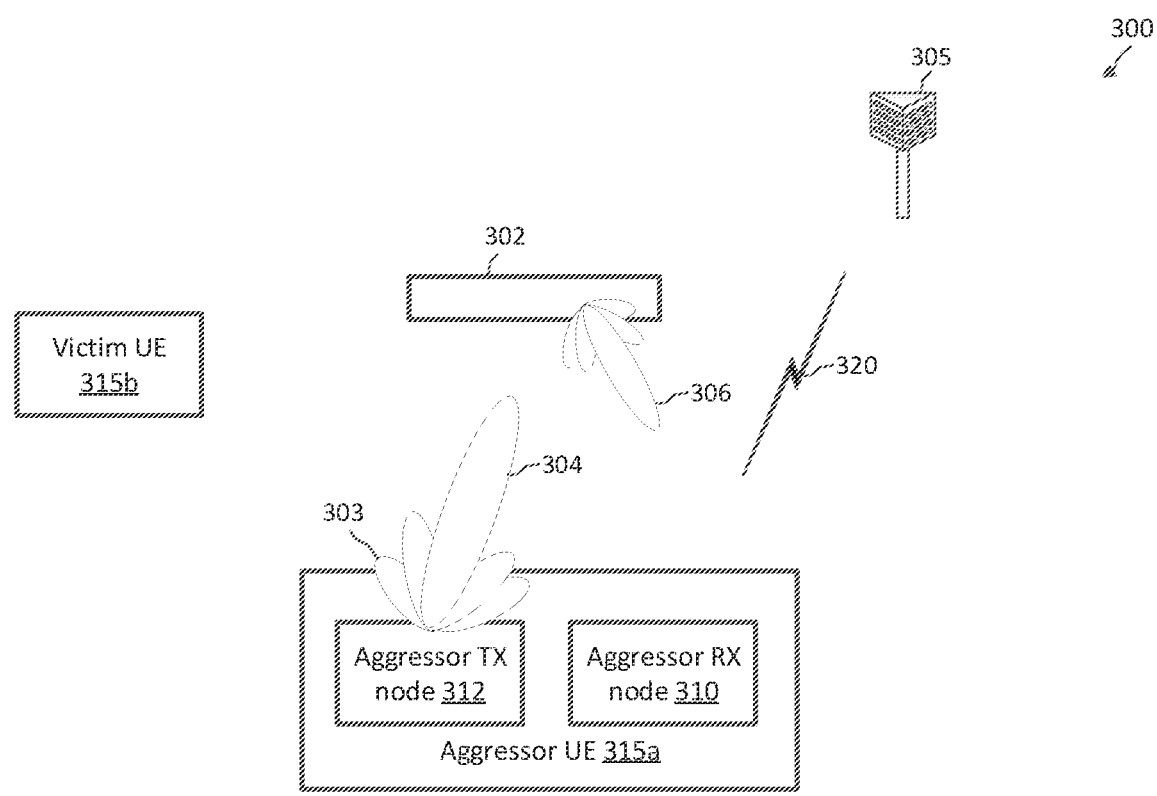
FIG. 3 illustrates a wireless communication network including one or more devices experiencing interference, according to some aspects of the present disclosure.

FIG. 3 is a diagram illustrating different types of interference in a wireless communication scheme 300, according to aspects of the present disclosure. In some aspects, FIG. 3 illustrates self-interference caused by an aggressor node operating based on a full duplex (FD) communication configuration, and cross-interference between the Aggressor UE 315a and a Victim UE 315b. In FD mode, the Aggressor UE 315a can be configured to transmit and receive communication signals on a same frequency band simultaneously. In half duplex (HD) mode, a UE is configured to transmit and receive communication signal over different frequency bands. The Aggressor UE 315a, in FD mode, transmits communication signals using an Aggressor Tx node 312, and receives communication signal using an Aggressor Rx node 310. The Aggressor Tx node 312 may include a first antenna or antenna array, and the Aggressor Rx node 310 may include a second antenna or antenna array. The antennas of the nodes 310, 312 may be isolated from one another. The Aggressor Tx node 312 may be configured to use directional beamforming to create a beam 304 directed toward a BS 305. Similarly, the BS 305 may be configured to use directional beamforming to maintain a communication link 320 with the Aggressor UE 315a. In some aspects, the beam 304 generated by the Aggressor Tx node 312 may include one or more side lobes 303. The side lobes 303 may travel in tangential directions. In some aspects, signal energy from one of the side lobes 303 may cause interference for the Victim UE 315b. This type of interference may be referred to as cross-interference. This side-lobe induced interference may be highly dynamic if the Aggressor UE 315a is a mobile device (e.g., smartphone).

In some instances, a reflector 302 in the cell region may reflect signal energy 306 from the beam 304 to the Aggressor Rx node 310 of the Aggressor UE 315a. Accordingly, because the Aggressor UE 315a is operating in FD mode, the Aggressor Rx node 310 may experience interference on the same frequency band. This type of interference may not be removed by band-pass filtering. In some aspects, the reflector 302 may be a mobile, dynamic obstacle, such as a vehicle in an urban environment. These types of reflectors 302 may create highly dynamic, rapid changes to signal energy received by the Rx node 310 and/or the Victim UE 315b. This interference may be particularly problematic for FD communications. For example, rapid changes in received signal energy caused by dynamic reflectors, side lobes from neighboring aggressor UEs, and/or any other type of interfering device, may cause saturation of the low noise amplifiers (LNAs), which may inhibit a UEs ability to digitize signals or digitally sample the signals during a slot until the LNA's gain state can be updated.

Figure 4:
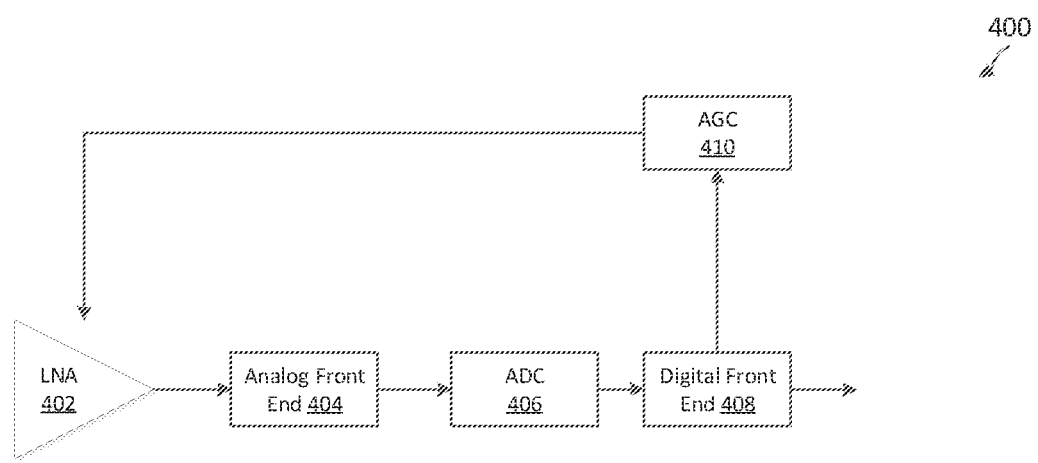
FIG. 4 is a diagram illustrating a signal processing circuit, according to some aspects of the present disclosure.

FIG. 4 is a schematic diagram of a digital sampling circuit 400 of a wireless communication device, according to aspects of the present disclosure. The digital sampling circuit 400 shown in FIG. 4 may be included in a UE, BS, relay device, and/or any other suitable wireless communication device. The digital sampling circuit 400 may be configured to receive analog signal energy from an antenna or antenna array, convert the analog signals to digital signals, and pass the digital signals to other components of the signal processing chain, such as a mode-division multiplexing (MDM) circuit.

The circuit 400 includes a low noise amplifier (LNA) 402 configured to receive radiofrequency (RF) signals from an antenna or antenna array. The LNA 402 is configured to amplify the received signals based on a gain state. The gain state may be determined or provided by an automatic gain control (AGC) circuit 410. The AGC 410 is configured to determine, based on signals provided by the digital front end 408 and/or other portions of the processing chain, a gain state which the LNA 402 uses to amplify the signals. In some aspects, the AGC 410 is configured to determine a reference signal strength indicator (RSSI), and to determine an updated gain state based on the RSSI. The AGC 410 may determine the RSSI based on synchronization signal blocks (SSBs), tracking reference signals (TRSs), PDSCH resources, and/or PUSCH resources. The amplified signals from the LNA 402 pass to analog front end circuitry 404. The analog front end circuitry 404 may include filters, oscillators, and/or other circuitry to prepare the amplified signals for digitization by the ADS 406 and the digital front end circuitry 408.

In some aspects, the gain state of the LNA 402 may not be correctly set such that the amplified signals from the LNA 402 are saturated. This may be caused by dynamic or rapidly changing interference in the environment. For example, reflectors, such as vehicles in an urban environment, may quickly and momentarily increase the amount of interference at a receiving device. The interference may include cross-interference or self-interference, as described above with respect to FIG. 3. Managing interference may be particularly challenging for full duplexed communications in which a wireless communication device is simultaneously transmitting and receiving signals on a same frequency band. In some aspects, if the signals are saturated, the ability for the wireless communication device to cancel or compensate for the interference may be limited. In some instances, a saturated signal from the LNA 402 may prevent the receiving device from decoding a communication. One factor of incorrect LNA gain states is the relatively sparse periodicity of the reference signals (e.g., SSB, TRS) used to update the LNA gain state. The relatively large periodicity of these signals may limit the ability of the LNA gain state to be updated quickly enough to account for sudden power changes due to cross interference and/or self-interference.

The present disclosure describes schemes, mechanisms, and devices for activating AGC reference signal resources for DL and/or UL communications for more responsive gain state updating. For example, a wireless communication device, such as a BS, may activate an AGC reference signal resource which includes at least a first symbol of a slot associated with a scheduled communication. The BS may transmit or receive the scheduled communication, where at least the first symbol includes one or more AGC reference signals. If the communication is a DL communication, for example, the UE may perform an AGC based on the AGC reference signal in the reference signal resource, and process the remaining symbols of the slot using an updated LNA gain state determined based on the AGC.

Figures 5A, 5B:
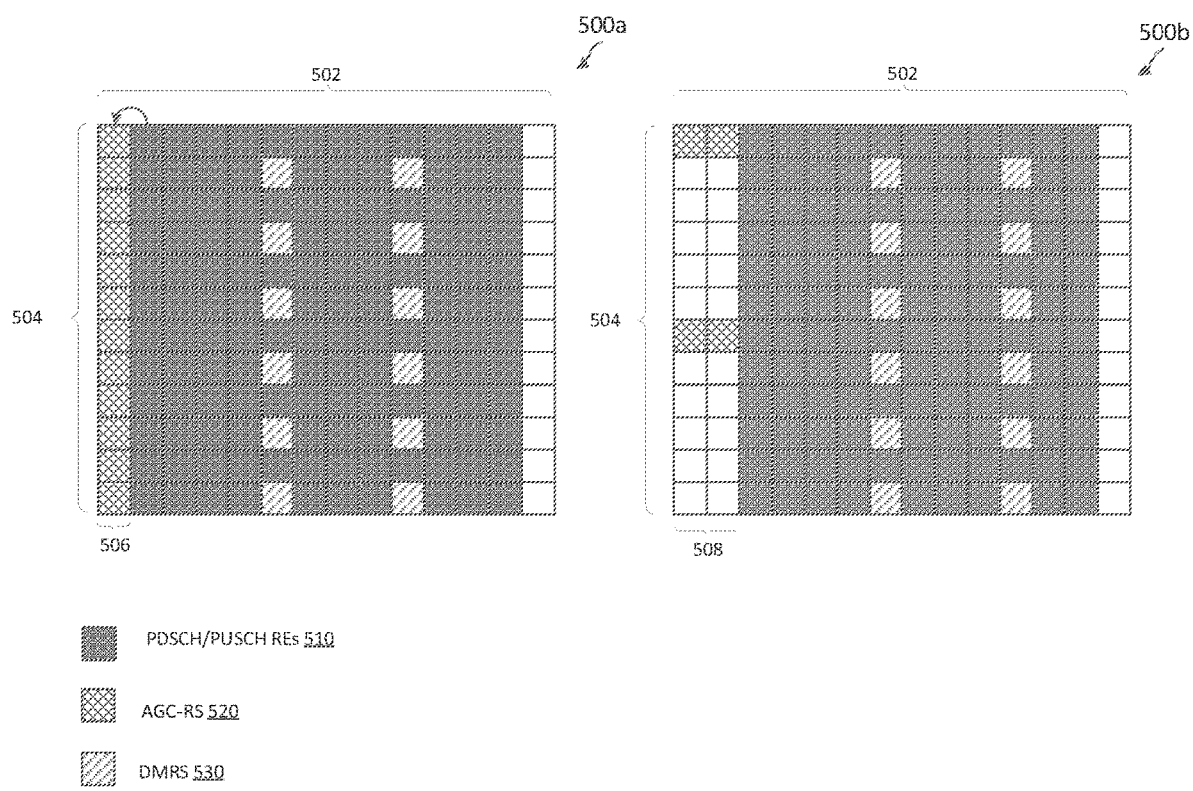
FIG. 5A illustrates a resource grid including automatic gain control (AGC) reference signal resources, according to some aspects of the present disclosure.
FIG. 5B illustrates a resource grid including automatic gain control (AGC) reference signal resources, according to some aspects of the present disclosure.

FIGS. 5A and 5B are diagrams illustrating resource grids 500 including allocations for AGC reference signal resources, according to aspects of the present disclosure. It will be understood that the allocations illustrated in FIGS. 5A and 5B may be used for DL communications, UL communications, SL communications, and/or any other suitable type of communication. Further, it will be understood that the allocations shown in FIGS. 5A and 5B are exemplary, and that the present disclosure contemplates various contemplations to the AGC reference signal resource allocations, including the number of symbols, and the density of the AGC reference signal resources in the frequency domain.

Referring to FIG. 5A, a time/frequency resource grid 500a is shown that spans a slot 502 having 14 symbols, including a first symbol 506. The grid 500a also shows 12 subcarriers in the frequency domain. The 12 subcarriers collectively form a resource block (RB) 504. The resource grid 500a may represent an allocation for a DL communication and/or a UL communication. However, the resource grid may be used for SL communications in some aspects, or any other suitable type of communication. In an exemplary embodiment, the resource grid 500a corresponds to a shared data channel, such as a PDSCH or a PUSCH. The resource grid 500a includes AGC reference signals 520 in the first symbol 506, and in each subcarrier of the RB 504. The remaining resource elements (REs) in the grid 500a include data REs, such as PDSCH or PUSCH REs 510, and DMRS resources 530. In the example shown in FIG. 5A, the AGC reference signals include repeats or duplicates of the immediately following symbol for the respective subcarrier in the PDSCH/PUSCH REs. However, in other aspects, the AGC reference signals may include other types of reference signals, such as reference signals based on known pilots. For example, the AGC reference signals 520 may be similar or identical to DMRS signals, CSI reference signals, phase tracking reference signals, tracking reference signals, and/or any other suitable type of signal.

Referring to FIG. 5B, the resource grid 500b includes AGC reference signals 520 in the first two symbols 508 of the slot 502. Accordingly, the AGC reference signal resources are contiguous and include the first symbol 506 of the slot 502. The AGC reference signal resources are distributed in the RB 504 to include two AGCs, one every six subcarriers. In other aspects, other frequency densities may be used. For example, the AGC reference signal resources may be allocated for every subcarrier, every other subcarrier, once every three, four, or five subcarriers, etc. In some aspects, a single AGC reference signal resource for the RB 504 may be provided in one of the subcarriers.

The allocations of PDSCH/PUSCH REs, AGC reference signal resources, and/or DMRS resources shown in FIGS. 5A and 5B may be modified in one or more ways without departing from the scope of the present disclosure. For example, it will be understood that the number of symbols of the AGC reference signal may be one, two, three, four, and/or any other suitable number of symbols. Accordingly, the AGC reference signal may include the first symbol, and the second, third, and/or fourth symbol, and so on. Further, in some aspects, other reference signals and/or data REs may be allocated within the first symbol, and/or the second symbol. In some aspects, the resource grids 500 may include fewer or more empty symbols than those shown in FIG. 5A.

For example, the last two, three, or four symbols of the slot 502 may include empty symbols for one or more subcarriers of the RB 504.

Figure 6:
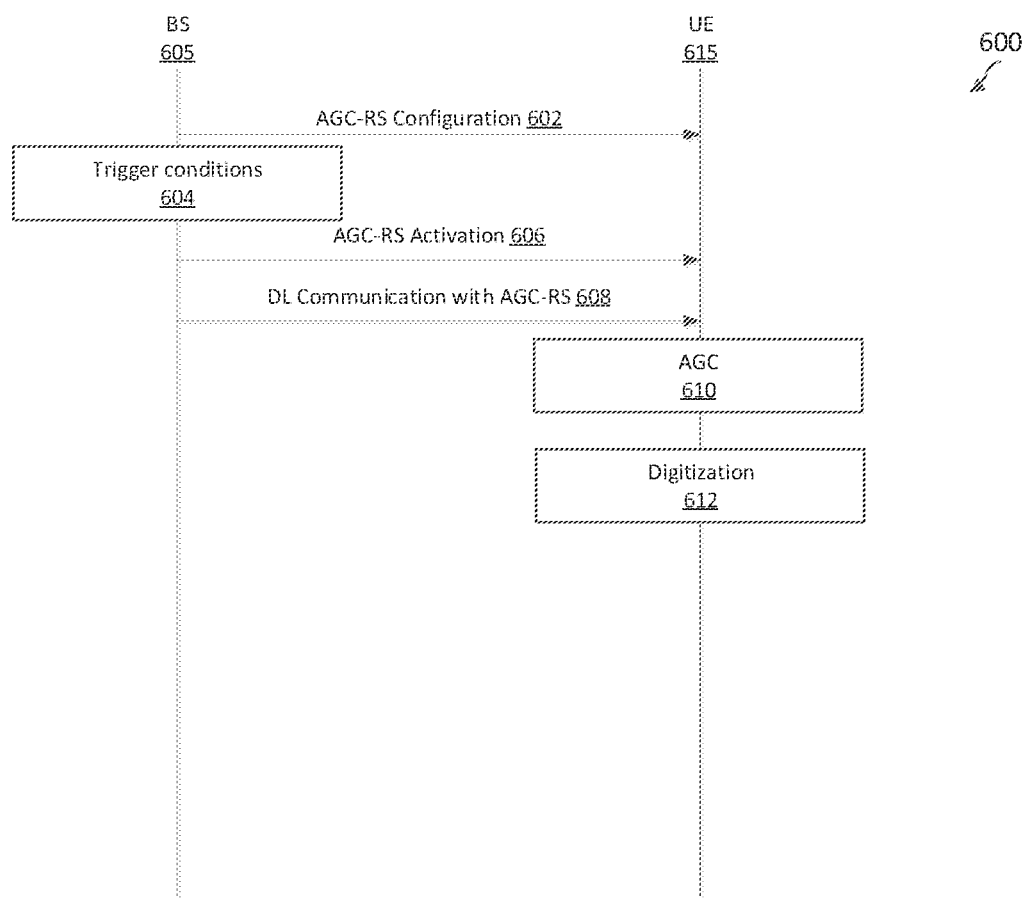
FIG. 6 is a signaling diagram illustrating a method of wireless communication, according to some aspects of the present disclosure.

FIG. 6 is a signaling diagram illustrating a wireless communication method 600 for activating and transmitting an AGC reference signal resource, according to aspects of the present disclosure. The method 600 is performed by the UE 615 and the BS 605. The UE 615 605 may be one of the UEs 115 in the network 100, and the BS 605 may be one of the BSs 105 in the network 100. Further, the UE 615 may include the UE 615 1000 described below.

Similarly, the BS 605 may include the BS 605 900 described below. As illustrated, the method 600 includes a number of enumerated steps, but aspects of the method 600 may include additional steps before, after, and in between the enumerated steps. In some aspects, one or more of the enumerated steps may be omitted or performed in a different order. In the method 600, the BS 605 may activate an AGC reference signal resource based on the occurrence of one or more trigger conditions.

At action 602, the BS 605 transmits, and the UE 615 receives, an automatic gain control (AGC) reference signal configuration. Action 602 may include the BS 605 transmitting a control signal indicating the AGC reference signal configuration. In some aspects, the control signal may include an RRC message or RRC configuration. In other aspects, the control signal may include a MAC information element and/or a MAC control element (MAC-CE). The AGC reference signal configuration may indicate the time and frequency resources for the AGC reference signal, including the first symbol of a slot associated with a scheduled DL or UL communication. For example, the AGC reference signal configuration may indicate a number of symbols allocated for the AGC reference signal. The number of symbols allocated for the AGC reference signal may be one, two, three, and/or any other suitable number of symbols. In some aspects, the AGC reference signal configuration may indicate other parameters or characteristics of the AGC reference signal, such as the type of signal. For example, the AGC reference signal configuration may indicate that the AGC reference signal is a copy or duplicate of the immediately following symbol. In another example, the AGC reference signal configuration may indicate a pilot signal so that the AGC reference signal can be used by the UE 615 for RSRP and/or SNR calculations. In some aspects, the AGC reference signal configuration may indicate a periodicity of the AGC reference signal. For example, the AGC reference signal configuration may indicate that an AGC reference signal resource will be allocated once every n slots. In another example, the AGC reference signal configuration may indicate that an AGC reference signal resource will be semi-persistently allocated. For example, the AGC reference signal configuration may indicate that a first AGC reference signal resource is allocated in a first slot, with x repetitions, and every y slots. In other aspects, the AGC reference signal configurations and/or signal characteristics may be preconfigured at the UE.

At action 604, the BS 605 monitors for, and detects, one or more triggering conditions for activating an AGC reference signal resource. The triggering conditions may be associated with communication conditions for which the AGC reference signal may be beneficial for the UE 615 to sample, digitize, and/or otherwise process DL communications from the BS 605. For example, the triggering conditions used by the BS 605 to activate the AGC reference signal resource may include the modulation and coding scheme (MCS) configured for DL and/or UL communications between the BS 605 and the UE 615. For example, if the BS 605 determines to use a MCS of a value n, the BS 605 may determine to activate the AGC reference signal resource for DL communications to the UE 615. For example, for higher MCS (e.g., 128 QAM, 256 QAM, etc.), the BS 605 may activate the AGC reference signal resource for DL and/or UL communications. In some aspects, the UE 615 may be implicitly indicated that the AGC reference signal is activated based on the MCS of a scheduled communication. For example, the UE 615 may be configured with a table correlating MCS values to AGC reference signal states (e.g., AGC reference signal activated/not activated). In some aspects, the MCS value may be associated with a number of AGC reference signal symbols activated for DL and/or UL communications. For example, the UE 615 may determine, based on the MCS value, a number of symbols (e.g., one, two three, etc.) in a slot that are allocated for an AGC reference signal.

In another example, the triggering conditions may include the priority rank, signal-to-noise ratio (SNR), spectral efficiency, and/or reported CQI of the UE. For example, the UE 615 may transmit periodic reports indicating SNR, priority rank, spectral efficiency, and/or CQI to the BS 605. If the BS 605 605 determines that any of these parameters do not satisfy a configured threshold, the BS 605 may determine to activate the AGC reference signal resource. In another example, the triggering condition may include a mobility of the UE 615. For example, in some aspects, the method 600 may include the UE 615 transmitting, and the BS 605 receiving, CLI reports including mobility indicators (MI) associated with the UE 615. If the MI exceeds a threshold, the BS 605 may determine to activate the AGC reference signal resource. In other aspects, the triggering conditions may include data channel type, detected beam switches from neighboring UEs, SRS receptions for the CLI report, and/or the geographical zone. As explained above, the triggering conditions may advantageously allow the BS 605 and/or the UE 615 to activate an AGC reference signal resource in conditions and situations in which the AGC reference signal may be more beneficial. On the other hand, the BS 605 and/or the UE 615 may refrain from activating the AGC reference signal resource if the conditions are such that the AGC can be performed, and the LNA gain state can be updated, based on SSB, TRS, and/or PDSCH resources. Accordingly, the AGC reference signal resource can be sparse and dynamically activated to reduce network costs.

At action 606, based on one or more triggering conditions detected at action 604, the UE 615 receives, from the BS 605, a signal activating an AGC reference signal resource. The AGC reference signal resource includes at least a first symbol of a slot associated with a scheduled downlink (DL) communication. In some embodiments, receiving the signal indicating the AGC reference signal resource includes receiving downlink control information indicating the AGC reference signal resource. For example, the DCI may indicate an activation of the AGC reference signal resource. In some aspects, the DCI may further indicate the time and frequency resources associated with the scheduled DL communication. For example, the DCI may carry both the DL grant and the AGC reference signal resource activation. In some aspects, the DCI may indicate time and frequency resources associated with a PDSCH.

In some aspects, the AGC reference signal activation is associated with the AGC reference signal configuration transmitted at action 602. The signal transmitted at action 606, and/or the AGC reference signal configuration transmitted at action 602, may be transmitted using dedicated or non-dedicated signaling. For example, the AGC reference signal resource activation may be a dedicated DCI transmitted in a PDCCH, or a group common message (e.g., DCI transmitted in a group common PDCCH). In another example, the AGC reference signal activation may be a broadcast message transmitted in a PBCH. In some aspects, the AGC reference signal configuration may include or indicate a mapping between different modulation coding scheme (MCS) values and a number of allocated AGC reference signal symbols. Based on the mapping, the UE 615 may determine whether there is an allocated AGC reference signal, and/or a number of symbols are allocated for the AGC reference signal in the scheduled DL communication. In this regard, as explained above, the activation of the AGC reference signal for the scheduled DL communication may be based on the characteristics of the communications between the BS 605 and the UE 615. In this regard, higher throughput MCSs may benefit from more rapid updating of the LNA gain state to accommodate rapid changes in interference.

At action 608, the BS 605 transmits, and the UE 615 receives, the scheduled DL communication in the slot, where the scheduled DL communication includes the AGC reference signal in the indicated AGC reference signal resource. As explained above, the AGC reference signal resource includes at least the first symbol of the slot associated with the scheduled DL communication. However, the AGC reference signal may be transmitted in more than one symbol, in some aspects. For example, the scheduled DL communication may be transmitted by the BS 605 in the slot, where the first one, two, or three symbols of the slot include the AGC reference signal. In some aspects, receiving the AGC reference signal in the AGC reference signal resource includes receiving a duplication or repeat of one or more of the symbols following the AGC reference signal. In another example, receiving the AGC reference signal includes receiving a reference signal associated with a known pilot, such as a channel state information reference signal (CSI-RS), phase tracking reference signal (PTRS), tracking reference signal (TRS), and/or demodulation reference signal (DMRS).

In some aspects, a single AGC reference signal may be received by the UE 615 in each resource block. In other aspects, more than one AGC reference signal may be received in each resource block. In other aspects, a single AGC reference signal may be received for each carrier frequency. In other aspects, more than one AGC reference signal may be received for each carrier frequency. For example, the UE 615 may receive an AGC reference signal in each subcarrier of each resource block. In some aspects, the AGC reference signal may be used by the UE 615 to calculate received signal strength indicator (RSSI), reference signal received power (RSRP), and/or signal to noise ratio (SNR).

In some aspects, actions 602-608 may be based on the duplexing mode of communication between the BS 605 and the UE 615. For example, in some aspects, the BS 605 is configured to transmit, and the UE 615 is configured to receive, the AGC reference signal based on the scheduled DL communication being a full duplex (FD) communication. In another aspect, the BS 605 is configured to transmit, and the UE 615 is configured to receive, the AGC reference signal based on the scheduled DL communication being a half-duplex (HD) communication.

At action 610, the UE 615 performs, based on the AGC reference signal, an AGC for the scheduled DL communication. In some aspects, performing the AGC includes determining a RSSI value based on the AGC reference signal. Because the AGC reference signal is in the first symbol of the slot, the UE 615 may be able to perform the AGC to update the gain state of the LNA in the analog front end for at least some of the remaining symbols in the slot including the DL communication. For example, if the AGC reference signal occupies only the first symbol of the slot, the UE 615 may perform the AGC to update the LNA gain state to digitize/sample the second symbol and all other remaining symbols of the slot. In another example, if the UE 615 is not configured with an LNA switch time capable of single-symbol gain state updating, the AGC reference signal may occupy the first two, three, four, or any other suitable number of symbols of the slot, where the symbols allocated for the AGC reference signal are contiguous and include the first symbol. The more frequent updating of the LNA gain state may reduce the probability that the LNA is saturated, and increases the probability that the LNA gain state has been correctly set or selected. Accordingly, the UE 615 may more effectively digitize or sample the signals for the remaining symbols in the slot.

At action 612, the UE 615 digitizes or samples the remaining symbols of the DL communication in the slot based on the AGC performed at action 610. For example, the LNA of the UE 615 may use an updated LNA gain state from the AGC performed based on the first symbol's AGC reference signal to amplify the RF signals associated with the remaining symbols of the slot, and pass the amplified signals to analog front end circuitry (e.g., 404, FIG. 4). The signals may then be digitally sampled by an ADC, and passed to digital front end circuitry (e.g., 408, FIG. 4) for further digital processing.

Figure 7:
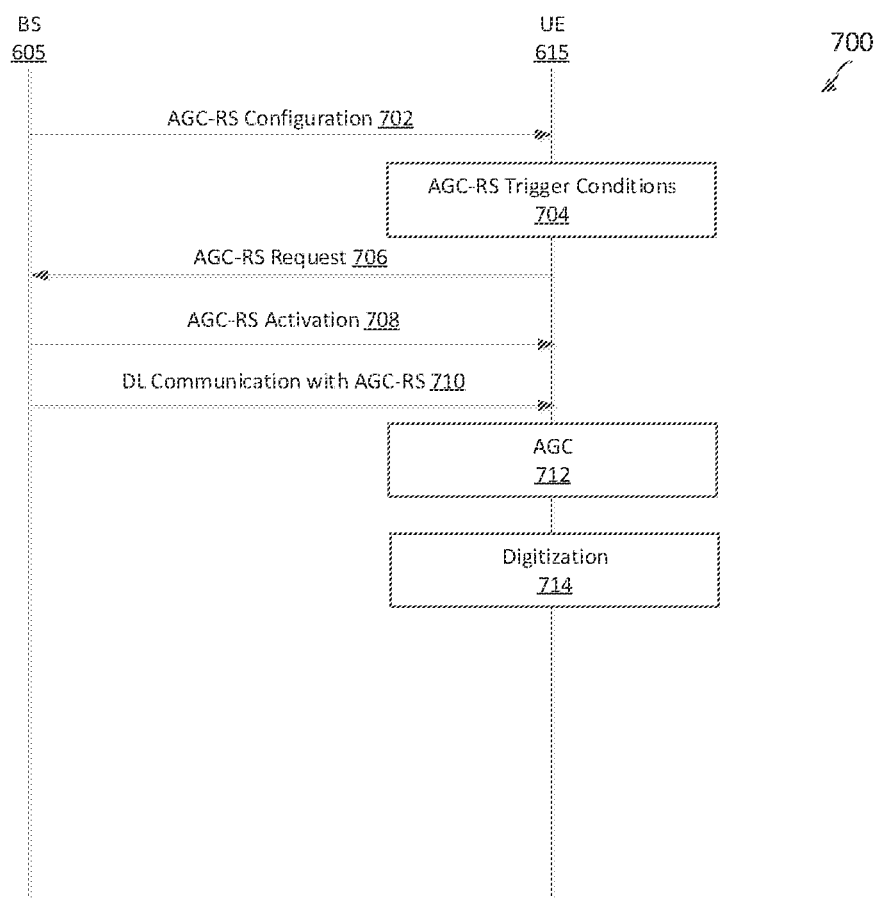
FIG. 7 is a signaling diagram illustrating a method of wireless communication, according to some aspects of the present disclosure.

FIG. 7 is a signaling diagram illustrating a wireless communication method 700 for activating and transmitting an AGC reference signal resource, according to aspects of the present disclosure. The method 700 is performed by the UE 615 and the BS 605. The UE 615 605 may be one of the UEs 115 in the network 100, and the BS 605 may be one of the BSs 105 in the network 100. Further, the UE 615 may include the UE 615 1000 described below. Similarly, the BS 605 may include the BS 605 900 described below. As illustrated, the method 700 includes a number of enumerated steps, but aspects of the method 700 may include additional steps before, after, and in between the enumerated steps. In some aspects, one or more of the enumerated steps may be omitted or performed in a different order. In the method 700, the UE 615 may request an AGC reference signal or reference signal resource based on the occurrence of one or more trigger conditions.

At action 702, the BS 605 transmits, and the UE 615 receives, an automatic gain control (AGC) reference signal configuration. Action 702 may include the BS 605 transmitting a control signal indicating the AGC reference signal configuration. In some aspects, the control signal may include an RRC message or RRC configuration. In other aspects, the control signal may include a MAC information element and/or a MAC control element (MAC-CE). The AGC reference signal configuration may indicate the time and frequency resources for the AGC reference signal, including the first symbol of a slot associated with a scheduled DL or UL communication. For example, the AGC reference signal configuration may indicate a number of symbols allocated for the AGC reference signal. The number of symbols allocated for the AGC reference signal may be one, two, three, and/or any other suitable number of symbols. In some aspects, the AGC reference signal configuration may indicate other parameters or characteristics of the AGC reference signal, such as the type of signal. For example, the AGC reference signal configuration may indicate that the AGC reference signal is a copy or duplicate of the immediately following symbol. In another example, the AGC reference signal configuration may indicate a pilot signal so that the AGC reference signal can be used by the UE 615 for RSRP and/or SNR calculations. In some aspects, the AGC reference signal configuration may indicate a periodicity of the AGC reference signal. For example, the AGC reference signal configuration may indicate that an AGC reference signal resource will be allocated once every n slots. In another example, the AGC reference signal configuration may indicate that an AGC reference signal resource will be semi-persistently allocated. For example, the AGC reference signal configuration may indicate that a first AGC reference signal resource is allocated in a first slot, with x repetitions, and every y slots. In other aspects, the AGC reference signal configurations and/or signal characteristics may be preconfigured at the UE.

At action 704, the UE 615 monitors for, and detects, one or more triggering conditions for requesting an AGC reference signal resource. The triggering conditions may be associated with communication conditions for which the AGC reference signal may be beneficial for the UE 615 to sample, digitize, and/or otherwise process DL communications from the BS 605. For example, the triggering conditions used by the UE 615 to request the AGC reference signal resource may include the modulation and coding scheme (MCS) configured for DL and/or UL communications between the BS 605 and the UE 615. For example, if the UE 615 receives a DCI indicating a MCS of a value n, the UE 615 may determine to request the AGC reference signal resource for DL communications to the UE 615. For example, for higher MCS (e.g., 128 QAM, 256 QAM, etc.), the UE 615 may request the AGC reference signal resource for DL and/or UL communications.

In another example, the triggering conditions may include the priority rank, signal-to-noise ratio (SNR), spectral efficiency, mobility, reported CQI, data channel type, detected beam switches from neighboring UEs, SRS receptions for the CLI report, and/or the geographical zone, as similarly described above with respect to action 604 in the method 600.

At action 706, based on one or more triggering conditions detected at action 704, the UE 615 transmits, to the BS 605, a request to for an AGC reference signal. For example, the UE 615 may request an AGC reference signal resource based on the MCS used by the UE 615 and/or the BS 605 for DL and/or UL communications. For example, the UE 615 may be configured with a table indicating, for each MCS value, weather the UE 615 should request an AGC reference signal resource, and/or a number of symbols for the AGC reference signal resource. In another example, the UE 615 may transmit the request to the BS 605 based on a level of mobility of the UE 615. For example, the UE 615 may transmit, to the BS 605, a request for a AGC reference signal resource based on a mobility indicator (MI) associated with the UE 615. in some aspects, the UE 615 may perform autonomous measurements to estimate the characteristics of dynamic clutter reflections, and transmit the request for the AGC reference signal resource based on the autonomous measurements.

At action 708, the BS 605 transmits, to the UE 615, a signal activating an AGC reference signal resource. The AGC reference signal resource includes at least a first symbol of a slot associated with a scheduled downlink (DL) communication. In some embodiments, receiving the signal indicating the AGC reference signal resource includes receiving downlink control information indicating the AGC reference signal resource. For example, the DCI may indicate an activation of the AGC reference signal resource. In some aspects, the DCI may further indicate the time and frequency resources associated with the scheduled DL communication. For example, the DCI may carry both the DL grant and the AGC reference signal resource activation. In some aspects, the DCI may indicate time and frequency resources associated with a PDSCH.

In some aspects, the AGC reference signal activation is associated with the AGC reference signal configuration transmitted at action 702. The signal transmitted at action 708, and/or the AGC reference signal configuration transmitted at action 702, may be transmitted using dedicated or non-dedicated signaling. For example, the AGC reference signal resource activation may be a dedicated DCI transmitted in a PDCCH, or a group common message (e.g., DCI transmitted in a group common PDCCH). In another example, the AGC reference signal activation may be a broadcast message transmitted in a PBCH.

At action 710, the BS 605 transmits, and the UE 615 receives, the scheduled DL communication in the slot, where the scheduled DL communication includes the AGC reference signal requested by the UE 615. As explained above, the AGC reference signal resource includes at least the first symbol of the slot associated with the scheduled DL communication. However, the AGC reference signal may be transmitted in more than one symbol, in some aspects. For example, the scheduled DL communication may be transmitted by the BS 605 in the slot, where the first one, two, or three symbols of the slot include the AGC reference signal. In some aspects, receiving the AGC reference signal in the AGC reference signal resource includes receiving a duplication or repeat of one or more of the symbols following the AGC reference signal. In another example, receiving the AGC reference signal includes receiving a reference signal associated with a known pilot, such as a channel state information reference signal (CSI-RS), phase tracking reference signal (PTRS), tracking reference signal (TRS), and/or demodulation reference signal (DMRS).

In some aspects, a single AGC reference signal may be received by the UE 615 in each resource block. In other aspects, more than one AGC reference signal may be received in each resource block. In other aspects, a single AGC reference signal may be received for each carrier frequency. In other aspects, more than one AGC reference signal may be received for each carrier frequency. For example, the UE 615 may receive an AGC reference signal in each subcarrier of each resource block. In some aspects, the AGC reference signal may be used by the UE 615 to calculate received signal strength indicator (RSSI), reference signal received power (RSRP), and/or signal to noise ratio (SNR).

It will be understood that, in some aspects, the BS 605 may not transmit a signal indicating an AGC reference signal resource activation. For example, the BS 605 may transmit, based on the request, the DL communication with the AGC reference signal. The DL communication with the AGC reference signal may implicitly indicate to the UE 615 that the AGC has been activated. In some aspects, actions 702-710 may be based on the duplexing mode of communication between the BS 605 and the UE 615. For example, in some aspects, the BS 605 is configured to transmit, and the UE 615 is configured to receive, the AGC reference signal based on the scheduled DL communication being a full duplex (FD) communication. In another aspect, the BS 605 is configured to transmit, and the UE 615 is configured to receive, the AGC reference signal based on the scheduled DL communication being a half-duplex (HD) communication.

At action 712, the UE 615 performs, based on the AGC reference signal, an AGC for the scheduled DL communication. In some aspects, performing the AGC includes determining a RSSI value based on the AGC reference signal. Because the AGC reference signal is in the first symbol of the slot, the UE 615 may be able to perform the AGC to update the gain state of the LNA in the analog front end for at least some of the remaining symbols in the slot including the DL communication. For example, if the AGC reference signal occupies only the first symbol of the slot, the UE 615 may perform the AGC to update the LNA gain state to digitize/sample the second symbol and all other remaining symbols of the slot. In another example, if the UE 615 is not configured with an LNA switch time capable of single-symbol gain state updating, the AGC reference signal may occupy the first two, three, four, or any other suitable number of symbols of the slot, where the symbols allocated for the AGC reference signal are contiguous and include the first symbol. The more frequent updating of the LNA gain state may reduce the probability that the LNA is saturated, and increases the probability that the LNA gain state has been correctly set or selected. Accordingly, the UE 615 may more effectively digitize or sample the signals for the remaining symbols in the slot.

At action 714, the UE 615 digitizes or samples the remaining symbols of the DL communication in the slot based on the AGC performed at action 710. For example, the LNA of the UE 615 may use an updated LNA gain state from the AGC performed based on the first symbol's AGC reference signal to amplify the RF signals associated with the remaining symbols of the slot, and pass the amplified signals to analog front end circuitry (e.g., 404, FIG. 4). The signals may then be digitally sampled by an ADC, and passed to digital front end circuitry (e.g., 408, FIG. 4) for further digital processing.

Figure 8:
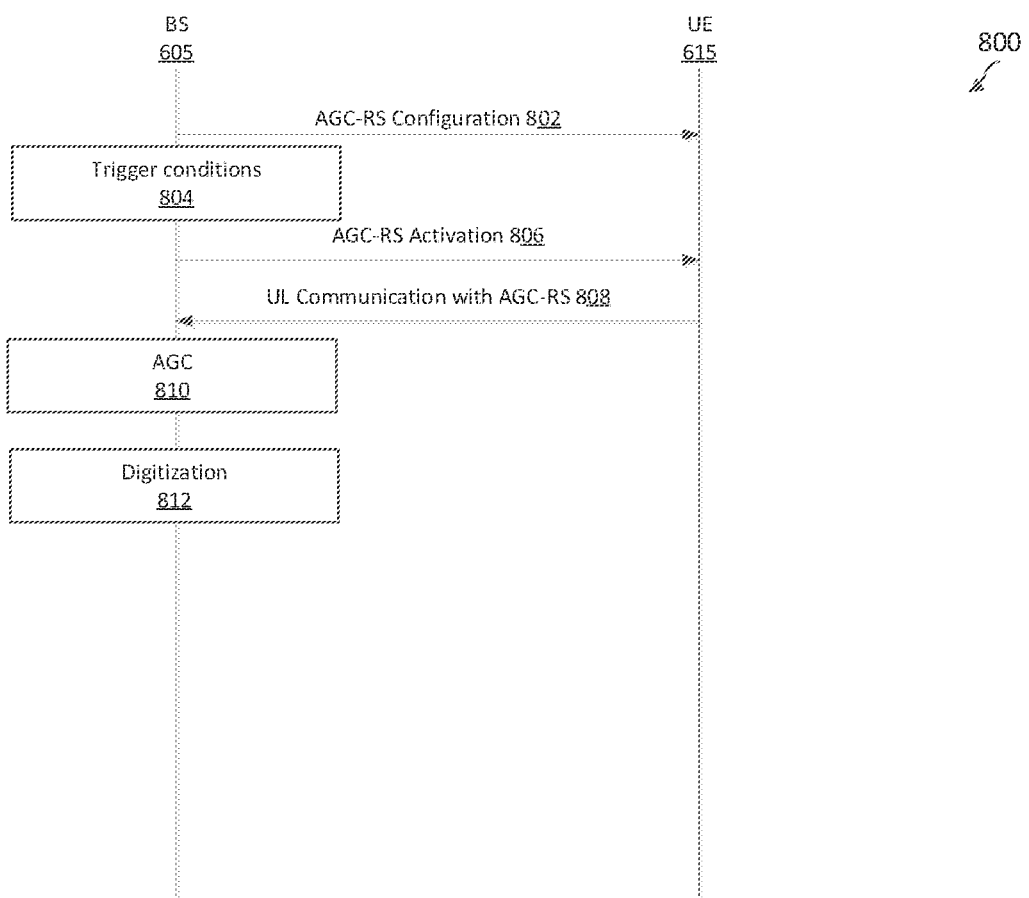
FIG. 8 is a signaling diagram illustrating a method of wireless communication, according to some aspects of the present disclosure.

FIG. 8 is a signaling diagram illustrating a wireless communication method 800 for activating and transmitting an AGC reference signal resource, according to aspects of the present disclosure. The method 800 is performed by the UE 615 and the BS 605. The UE 615 605 may be one of the UEs 115 in the network 100, and the BS 605 may be one of the BSs 105 in the network 100. Further, the UE 615 may include the UE 615 1000 described below. Similarly, the BS 605 may include the BS 605 900 described below. As illustrated, the method 800 includes a number of enumerated steps, but aspects of the method 800 may include additional steps before, after, and in between the enumerated steps. In some aspects, one or more of the enumerated steps may be omitted or performed in a different order. In the method 800, the BS 605 may request an AGC reference signal for a UL communication based on the occurrence of one or more trigger conditions.

At action 802, the BS 605 transmits, and the UE 615 receives, an automatic gain control (AGC) reference signal configuration. Action 802 may include the BS 605 transmitting a control signal indicating the AGC reference signal configuration. In some aspects, the control signal may include an RRC message or RRC configuration. In other aspects, the control signal may include a MAC information element and/or a MAC control element (MAC-CE). The AGC reference signal configuration may indicate the time and frequency resources for the AGC reference signal, including the first symbol of a slot associated with a scheduled DL or UL communication. For example, the AGC reference signal configuration may indicate a number of symbols allocated for the AGC reference signal. The number of symbols allocated for the AGC reference signal may be one, two, three, and/or any other suitable number of symbols. In some aspects, the AGC reference signal configuration may indicate other parameters or characteristics of the AGC reference signal, such as the type of signal. For example, the AGC reference signal configuration may indicate that the AGC reference signal is a copy or duplicate of the immediately following symbol. In another example, the AGC reference signal configuration may indicate a pilot signal so that the AGC reference signal can be used by the UE 615 for RSRP and/or SNR calculations. In some aspects, the AGC reference signal configuration may indicate a periodicity of the AGC reference signal. For example, the AGC reference signal configuration may indicate that an AGC reference signal resource will be allocated once every n slots. In another example, the AGC reference signal configuration may indicate that an AGC reference signal resource will be semi-persistently allocated. For example, the AGC reference signal configuration may indicate that a first AGC reference signal resource is allocated in a first slot, with x repetitions, and every y slots. In other aspects, the AGC reference signal configurations and/or signal characteristics may be preconfigured at the UE. As described further below, the UE 615 may use the AGC reference signal configuration for transmitting an AGC reference signal to the BS 605 in response to an AGC reference signal activation for a UL communication.

At action 804, the BS 605 monitors for, and detects, one or more triggering conditions for activating an AGC reference signal resource for a UL communication. The triggering conditions may be associated with communication conditions for which the AGC reference signal may be beneficial for the BS 605 to sample, digitize, and/or otherwise process DL communications from the UE 615. For example, the triggering conditions used by the BS 605 to activate the AGC reference signal resource may include the modulation and coding scheme (MCS) configured for DL and/or UL communications between the BS 605 and the UE 615.

For example, if the BS 605 determines to use a MCS of a value n, the BS 605 may determine to activate the AGC reference signal resource for UL communications from the UE 615. For example, for higher MCS (e.g., 128 QAM, 256 QAM, etc.), the BS 605 may activate the AGC reference signal resource for DL and/or UL communications. In some aspects, the UE 615 may be implicitly indicated that the AGC reference signal is activated based on the MCS of a scheduled UL communication. For example, the UE 615 may be configured with a table correlating MCS values to AGC reference signal states (e.g., AGC reference signal activated/not activated). In some aspects, the MCS value may be associated with a number of AGC reference signal symbols activated for DL and/or UL communications. For example, the UE 615 may determine, based on the MCS value, a number of symbols (e.g., one, two three, etc.) in a slot that are allocated for an AGC reference signal.

In another example, the triggering conditions may include the priority rank, signal-to-noise ratio (SNR), spectral efficiency, mobility, reported CQI, data channel type, detected beam switches from neighboring UEs, SRS receptions for the CLI report, and/or the geographical zone, as similarly described above with respect to action 604 in the method 600.

At action 806, based on one or more triggering conditions detected at action 804, the UE 615 receives, from the BS 605, a signal activating an AGC reference signal resource for a UL communication. The AGC reference signal resource includes at least a first symbol of a slot associated with a scheduled UL communication. In some embodiments, receiving the signal indicating the AGC reference signal resource includes receiving downlink control information indicating the AGC reference signal resource. For example, the DCI may indicate an activation of the AGC reference signal resource. In some aspects, the DCI may further indicate the time and frequency resources associated with the scheduled UL communication. For example, the DCI may carry both the UL grant and the AGC reference signal resource activation. In some aspects, the DCI may indicate time and frequency resources associated with a PUSCH.

In some aspects, the AGC reference signal activation is associated with the AGC reference signal configuration transmitted at action 802. The signal transmitted at action 806, and/or the AGC reference signal configuration transmitted at action 802, may be transmitted using dedicated or non-dedicated signaling. For example, the AGC reference signal resource activation may be a dedicated DCI transmitted in a PDCCH, or a group common message (e.g., DCI transmitted in a group common PDCCH). In another example, the AGC reference signal activation may be a broadcast message transmitted in a PBCH. In some aspects, the AGC reference signal configuration may include or indicate a mapping between different modulation coding scheme (MCS) values and a number of allocated AGC reference signal symbols. Based on the mapping, the UE 615 may determine whether to transmit an AGC reference signal with a scheduled UL communication, and/or a number of symbols are allocated for the AGC reference signal in the scheduled UL communication. In this regard, as explained above, the activation of the AGC reference signal for the scheduled UL communication may be based on the characteristics of the communications between the BS 605 and the UE 615.

At action 808, the UE 615 transmits, and the BS 605 receives, the scheduled UL communication in the slot, where the scheduled UL communication includes the AGC reference signal in the indicated AGC reference signal resource. As explained above, the AGC reference signal resource includes at least the first symbol of the slot associated with the scheduled UL communication. However, the AGC reference signal may be transmitted in more than one symbol, in some aspects. For example, the scheduled UL communication may be transmitted by the UE 615 in the slot, where the first one, two, or three symbols of the slot include the AGC reference signal. In some aspects, receiving the AGC reference signal in the AGC reference signal resource includes receiving a duplication or repeat of one or more of the symbols following the AGC reference signal. In another example, receiving the AGC reference signal includes receiving a reference signal associated with a known pilot, such as a channel state information reference signal (CSI-RS), phase tracking reference signal (PTRS), tracking reference signal (TRS), and/or demodulation reference signal (DMRS).

In some aspects, a single AGC reference signal may be transmitted by the UE 615 in each resource block. In other aspects, more than one AGC reference signal may be transmitted in each resource block. In other aspects, a single AGC reference signal may be transmitted for each carrier frequency. In other aspects, more than one AGC reference signal may be transmitted for each carrier frequency. For example, the UE 615 may transmit an AGC reference signal in each subcarrier of each resource block. In some aspects, the AGC reference signal may be used by the BS 605 to calculate received signal strength indicator (RSSI), reference signal received power (RSRP), and/or signal to noise ratio (SNR).

In some aspects, actions 802-808 may be based on the duplexing mode of communication between the BS 605 and the UE 615. For example, in some aspects, the UE 615 is configured to transmit, and the BS 605 is configured to receive, the AGC reference signal based on the scheduled UL communication being a full duplex (FD) communication. In another aspect, the UE 615 is configured to transmit, and the BS 605 is configured to receive, the AGC reference signal based on the scheduled UL communication being a half-duplex (HD) communication.

At action 810, the BS 605 performs, based on the AGC reference signal, an AGC for the scheduled UL communication. In some aspects, performing the AGC includes determining a RSSI value based on the AGC reference signal. Because the AGC reference signal is in the first symbol of the slot, the BS 605 may be able to perform the AGC to update the gain state of the LNA in the analog front end for at least some of the remaining symbols in the slot including the UL communication. For example, if the AGC reference signal occupies only the first symbol of the slot, the BS 605 may perform the AGC to update the LNA gain state to digitize/sample the second symbol and all other remaining symbols of the slot. In another example, if the BS 605 is not configured with an LNA switch time capable of single-symbol gain state updating, the AGC reference signal may occupy the first two, three, four, or any other suitable number of symbols of the slot, where the symbols allocated for the AGC reference signal are contiguous and include the first symbol. The more frequent updating of the LNA gain state may reduce the probability that the LNA is saturated, and increases the probability that the LNA gain state has been correctly set or selected. Accordingly, the BS 605 may more effectively digitize or sample the signals for the remaining symbols in the slot.

At action 812, the BS 605 digitizes or samples the remaining symbols of the UL communication in the slot based on the AGC performed at action 810. For example, the LNA of the BS 605 may use an updated LNA gain state from the AGC performed based on the first symbol's AGC reference signal to amplify the RF signals associated with the remaining symbols of the slot, and pass the amplified signals to analog front end circuitry (e.g., 404, FIG. 4). The signals may then be digitally sampled by an ADC, and passed to digital front end circuitry (e.g., 408, FIG. 4) for further digital processing.

Figure 9:
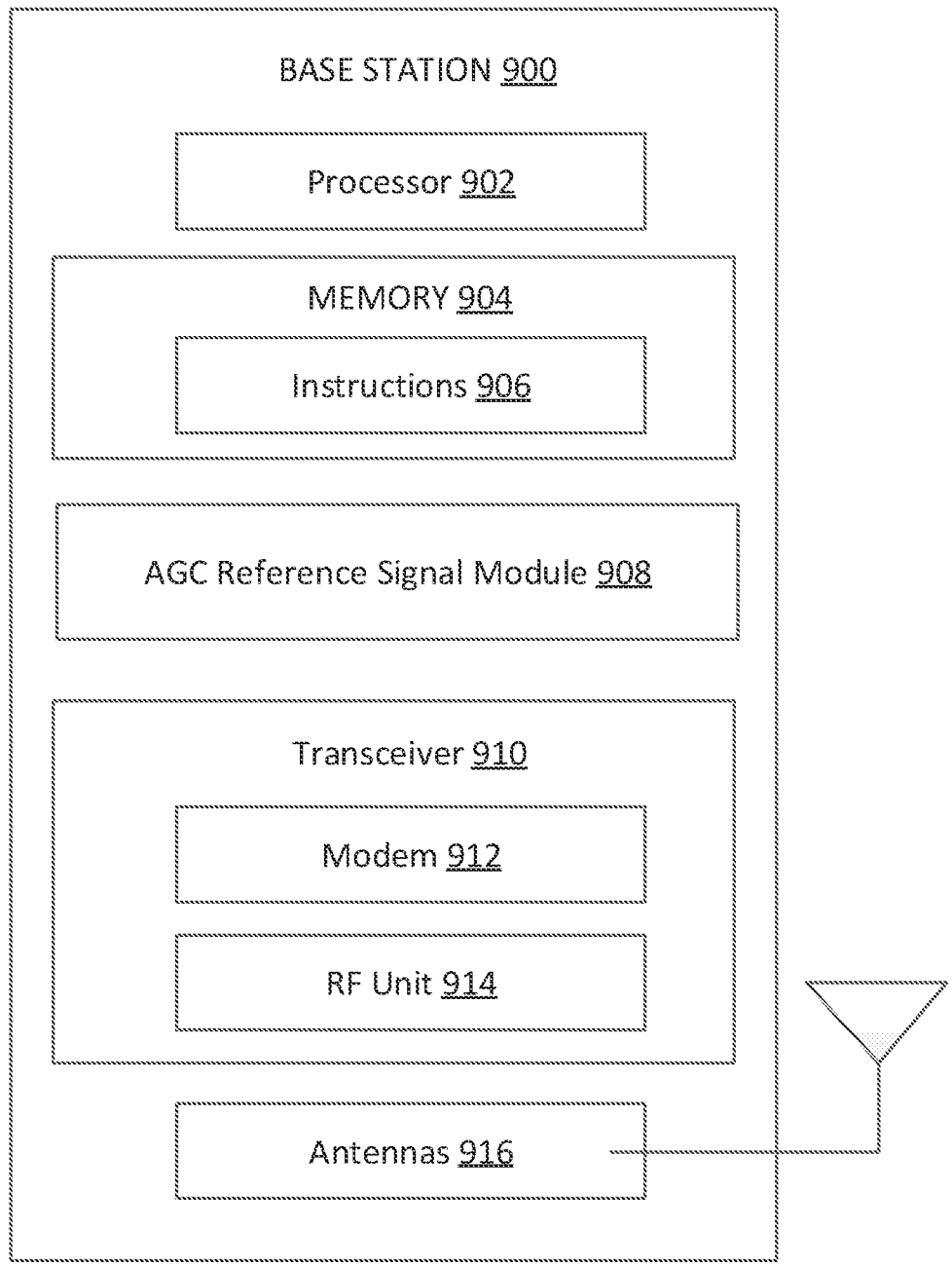
FIG. 9 is a block diagram of an exemplary base station (BS), according to aspects of the present disclosure.

FIG. 9 is a block diagram of an exemplary base station (BS) 900 according to some aspects of the present disclosure. The BS 900 may be a BS 105 discussed above in FIG. 1. As shown, the BS 900 may include a processor 902, a memory 904, a AGC reference signal module 908, a transceiver 910 including a modem subsystem 912 and a radio frequency (RF) unit 914, and one or more antennas 916. These elements may be in direct or indirect communication with each other, for example via one or more buses.

The processor 902 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 904 includes a non-transitory computer-readable medium. The memory 904 may store, or have recorded thereon, instructions 906. The instructions 906 may include instructions that, when executed by the processor 902, cause the processor 902 to perform the operations described herein in connection with aspects of the present disclosure, for example, aspects of FIGS. 4-8, 11, and 12. Instructions 906 may also be referred to as program code, which may be interpreted broadly to include any type of computer-readable statement(s).

The AGC reference signal module 908 may be implemented via hardware, software, or combinations thereof. For example, the AGC reference signal module 908 may be implemented as a processor, circuit, and/or instructions 906 stored in the memory 904 and executed by the processor 902. In some examples, the AGC reference signal module 908 can be integrated within the modem subsystem 912. For example, the AGC reference signal module 908 can be implemented by a combination of software components (e.g., executed by a DSP or a general processor) and hardware components (e.g., logic gates and circuitry) within the modem subsystem 912.

The AGC reference signal module 908 may be used for various aspects of the present disclosure, for example, aspects of FIGS. 4-8, 11, and 12. The AGC reference signal module 908 may be configured to transmit, to a user equipment (UE), a signal indicating an AGC reference signal resource, wherein the AGC reference signal resource includes at least a first symbol of a slot associated with a scheduled uplink (UL) communication. The AGC reference signal module 908 may be further configured to receive, from the UE, the scheduled UL communication in the slot, wherein the scheduled UL communication includes an AGC reference signal in the AGC reference signal resource. The AGC reference signal module 908 may be further configured to perform, based on the AGC reference signal, AGC for the scheduled UL communication.

In some aspects, the AGC reference signal module 908 may be configured to transmit to the UE a system information block (SIB) including a RS configuration for a periodic RS occasion for receiving the periodic RS. In some aspects, the AGC reference signal module 908 may be configured to receive, from the UE, a hybrid automatic repeat request-acknowledgment (HARQ-ACK) for the received activation command, the periodic RS occasion for receiving the periodic RS falling within a time window starting at least a threshold duration after the transmitting the HARQ-ACK.

In some aspects, the AGC reference signal module 908 may be configured to transmit, to the UE and within the time window but prior to the periodic RS occasion, a SSB for use in activating the SCell. In some aspects, the periodic RS occasion includes a plurality of RS occasions and the AGC reference signal module 908 may be configured to transmit, to the UE, an indication indicating an RS occasion of the plurality of RS occasions via which the periodic RS is received at the UE.

In some aspects, the AGC reference signal module 908 may be configured to transmit to the UE an indication for the UE to use the periodic RS to perform the tracking loop to activate the SCell. In some aspects, the transceiver is further configured to transmit an indication indicating whether an aperiodic RS is transmitted by the BS to the UE to activate the SCell.

As shown, the transceiver 910 may include a modem subsystem 912 and an RF unit 914. The transceiver 910 can be configured to communicate bi-directionally with other devices, such as the BSs 105. The modem subsystem 912 may be configured to modulate and/or encode the data from the memory 904 according to a modulation and coding scheme (MCS), e.g., a low-density parity check (LDPC) coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data (e.g., PUSCH signal, UL data, SRSs, UE capability reports, RI reports) from the modem subsystem 912 (on outbound transmissions) or of transmissions originating from another source such as a UE 115 or a BS 105. The RF unit 914 may be further configured to perform analog beamforming in conjunction with the digital beamforming. Although shown as integrated together in transceiver 910, the modem subsystem 912 and the RF unit 914 may be separate devices that are coupled together at the BS 900 to enable the BS 900 to communicate with other devices.

The RF unit 914 may provide modulated and/or processed data, e.g. data packets (or, more generally, data messages that may contain one or more data packets and other information), to the antennas 916 for transmission to one or more other devices. The antennas 916 may further receive data messages transmitted from other devices. The antennas 916 may provide the received data messages for processing and/or demodulation at the transceiver 910. The transceiver 910 may provide the demodulated and decoded data (e.g., PDSCH signal, PDCCH, DL data, activation command, availability indictor signaling, etc.) to the AGC reference signal module 908. The antennas 916 may include multiple antennas of similar or different designs in order to sustain multiple transmission links. The RF unit 914 may configure the antennas 916.

In an aspect, the BS 900 can include multiple transceivers 910 implementing different RATs (e.g., NR and LTE). In an aspect, the BS 900 can include a single transceiver 910 implementing multiple RATs (e.g., NR and LTE). In an aspect, the transceiver 910 can include various components, where different combinations of components can implement different RATs.

Figure 10:
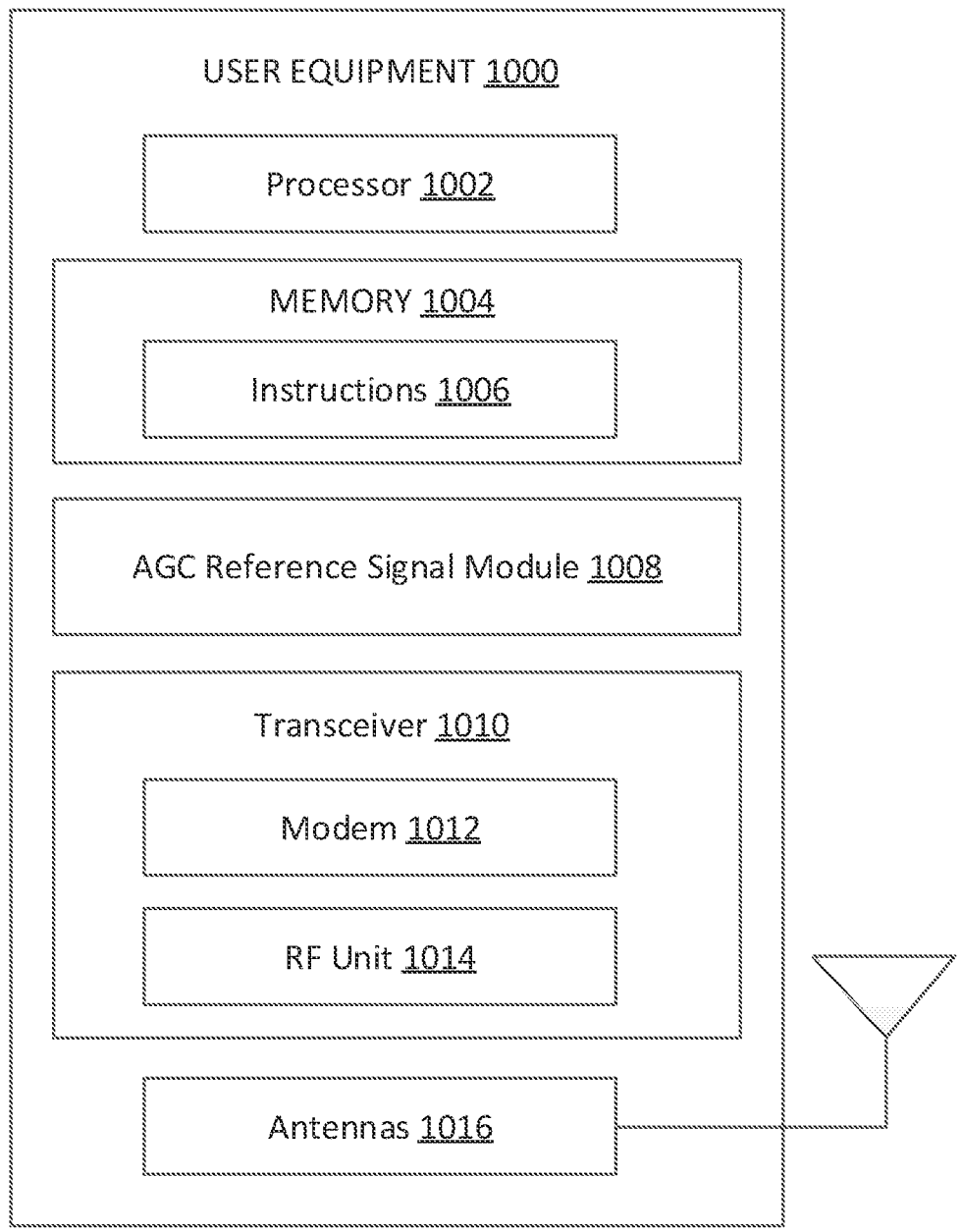
FIG. 10 is a block diagram of an exemplary user equipment (UE), according to some aspects of the present disclosure.

FIG. 10 is a block diagram of an exemplary UE 1000 according to some aspects of the present disclosure. The UE 1000 may be a UE 115 in the network 100 as discussed above in FIG. 1. As shown, the UE 1000 may include a processor 1002, a memory 1004, a AGC reference signal module 1008, a transceiver 1010 including a modem subsystem 1012 and a RF unit 1014, and one or more antennas 1016. These elements may be in direct or indirect communication with each other, for example via one or more buses.

The processor 1002 may have various features as a specific-type processor. For example, these may include a CPU, a DSP, an ASIC, a controller, a FPGA device, another hardware device, a firmware device, or any combination thereof configured to perform the operations described herein. The processor 1002 may also be implemented as a combination of computing devices, e.g., a combination of a DSP and a microprocessor, a plurality of microprocessors, one or more microprocessors in conjunction with a DSP core, or any other such configuration.

The memory 1004 may include a cache memory (e.g., a cache memory of the processor 1002), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1004 may include a non-transitory computer-readable medium. The memory 1004 may store instructions 1006. The instructions 1006 may include instructions that, when executed by the processor 1002, cause the processor 1002 to perform operations described herein, for example, aspects of FIGS. 4-8, 11, and 12. Instructions 1006 may also be referred to as program code. The program code may be code for causing a wireless communication device to perform these operations, for example by causing one or more processors (such as processor 1002) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The AGC reference signal module 1008 may be implemented via hardware, software, or combinations thereof. For example, the AGC reference signal module 1008 may be implemented as a processor, circuit, and/or instructions 1006 stored in the memory 1004 and executed by the processor 1002. In some examples, the AGC reference signal module 1008 can be integrated within the modem subsystem 1012. For example, the AGC reference signal module 1008 can be implemented by a combination of software components (e.g., executed by a DSP or a general processor) and hardware components (e.g., logic gates and circuitry) within the modem subsystem 1012. The AGC reference signal module 1008 may be used for various aspects of the present disclosure, for example, aspects of FIGS. 4-8, 11, and 12. For example, the AGC reference signal module 1008 can be configured to receive, from a base station (BS), a signal indicating an AGC reference signal resource, wherein the AGC reference signal resource includes at least a first symbol of a slot associated with a scheduled downlink (DL) communication. The AGC reference signal module 1008 may be further configured to receive, from the BS, the scheduled DL communication in the slot, wherein the scheduled DL communication includes an AGC reference signal in the AGC reference signal resource. The AGC reference signal module 1008 may be further configured to perform, based on the AGC reference signal, AGC for the scheduled DL communication.

As shown, the transceiver 1010 may include the modem subsystem 1012 and the RF unit 1014. The transceiver 1010 can be configured to communicate bi-directionally with other devices, such as the UEs 115, and/or another core network element. The modem subsystem 1012 may be configured to modulate and/or encode data according to a MCS, e.g., a LDPC coding scheme, a turbo coding scheme, a convolutional coding scheme, a digital beamforming scheme, etc. The RF unit 1014 may be configured to process (e.g., perform analog to digital conversion or digital to analog conversion, etc.) modulated/encoded data (e.g., PSBCH, sidelink RMSI, PSSCH, PSCCH, PSFCH, PC5-RRC configuration, control commands) from the modem subsystem 1012 (on outbound transmissions) or of transmissions originating from another source such as a UE 115. The RF unit 1014 may be further configured to perform analog beamforming in conjunction with the digital beamforming. Although shown as integrated together in transceiver 1010, the modem subsystem 1012 and/or the RF unit 1014 may be separate devices that are coupled together at a UE 115 to enable the UE 115 to communicate with other devices.

The RF unit 1014 may provide the modulated and/or processed data, e.g. data packets (or, more generally, data messages that may contain one or more data packets and other information), to the antennas 1016 for transmission to one or more other devices. This may include, for example, transmission of information to complete attachment to a network and communication with a camped UE 115 according to some aspects of the present disclosure. The antennas 1016 may further receive data messages transmitted from other devices and provide the received data messages for processing and/or demodulation at the transceiver 1010. The transceiver 1010 may provide the demodulated and decoded data (e.g., PSCCH, PSSCH, PSFCH, measurement data, sensor data records, activation command, availability indicator signaling, etc.) to the AGC reference signal module 1008 for processing. The antennas 1016 may include multiple antennas of similar or different designs in order to sustain multiple transmission links.

In some aspects, the transceiver 1010 is configured to communicate with the base station (BS) to receive, from a base station (BS) a signal indicating an activation of an AGC reference signal resource, and to receive, from the BS, an AGC reference signal in the AGC reference signal resource.

In an aspect, the UE 1000 can include multiple transceivers 1010 implementing different RATs (e.g., NR and LTE). In an aspect, the UE 1000 can include a single transceiver 1010 implementing multiple RATs (e.g., NR and LTE). In an aspect, the transceiver 1010 can include various components, where different combinations of components can implement different RATs.

Figure 11:
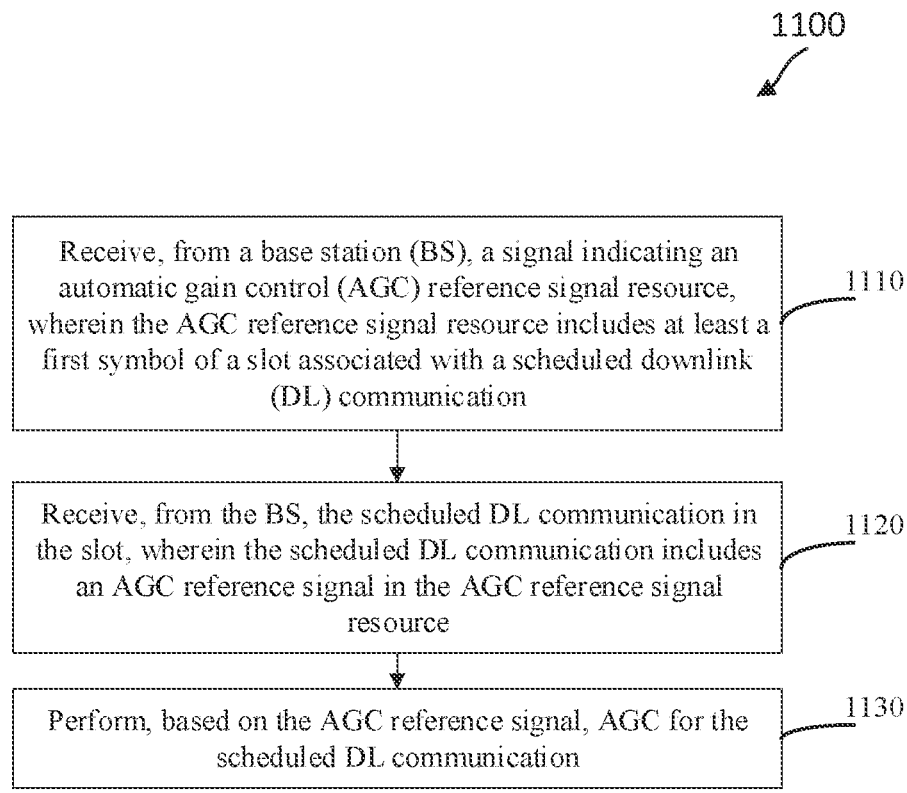
FIG. 11 illustrates a flow diagram of a wireless communication method, according to some aspects of the present disclosure.

FIG. 11 is a flow diagram of a wireless communication method 1100 according to some aspects of the present disclosure. Aspects of the method 1100 can be executed by a computing device (e.g., a processor, processing circuit, and/or other suitable component) of a wireless communication device or other suitable means for performing the steps. For example, a wireless communication device, such as the UEs 115 may utilize one or more components, such as the processor 1002, the memory 1004, the AGC reference signal module 1008, the transceiver 1010, the modem 1012, and the one or more antennas 1016, to execute the steps of method 1100. As illustrated, the method 1100 includes a number of enumerated steps, but aspects of the method 1100 may include additional steps before, after, and in between the enumerated steps. In some aspects, one or more of the enumerated steps may be omitted or performed in a different order.

At block 1110, a user equipment (UE) receives, from a base station (BS), a signal indicating an automatic gain control (AGC) reference signal resource. The AGC reference signal resource includes at least a first symbol of a slot associated with a scheduled downlink (DL) communication. In some embodiments, receiving the signal indicating the AGC reference signal resource includes receiving downlink control information (DCI) indicating the AGC reference signal resource. For example, the DCI may indicate an activation of the AGC reference signal resource. In some aspects, the DCI may further indicate the time and frequency resources associated with the scheduled DL communication. For example, the DCI may carry both the DL grant and the AGC reference signal resource activation. In some aspects, the DCI may indicate time and frequency resources associated with a PDSCH.

In some aspects, the AGC reference signal activation is associated with an AGC reference signal configuration. For example, the method 1100 may include receiving, from the BS, a first control signal indicating an AGC reference signal configuration. Block 1110 may further include receiving a second control signal indicating an activation of the AGC reference signal configuration. In some aspects, the first control signal may include an RRC message or RRC configuration. In other aspects, the first control signal may include a MAC information element and/or a MAC control element (MAC-CE). The AGC reference signal configuration may indicate the time and frequency resources for the AGC reference signal, including the first symbol of the slot associated with scheduled DL communication. For example, the AGC reference signal configuration may indicate a number of symbols allocated for the AGC reference signal. The number of symbols allocated for the AGC reference signal may be one, two, three, and/or any other suitable number of symbols. In some aspects, the AGC reference signal configuration may indicate other parameters or characteristics of the AGC reference signal, such as the type of signal. For example, the AGC reference signal configuration may indicate that the AGC reference signal is a copy or duplicate of the immediately following symbol. In another example, the AGC reference signal configuration may indicate a pilot signal so that the AGC reference signal can be used by the UE for RSRP and/or SNR calculations. In some aspects, the AGC reference signal configuration may indicate a periodicity of the AGC reference signal. For example, the AGC reference signal configuration may indicate that an AGC reference signal resource will be allocated once every n slots. In another example, the AGC reference signal configuration may indicate that an AGC reference signal resource will be semi-persistently allocated. For example, the AGC reference signal configuration may indicate that a first AGC reference signal resource is allocated in a first slot, with x repetitions, and every y slots. In other aspects, the AGC reference signal configurations and/or signal characteristics may be preconfigured at the UE.

The signal transmitted at block 1110, and/or the AGC reference signal configuration, may be transmitted using dedicated or non-dedicated signaling. For example, the signal indicating the AGC reference signal resource may be a dedicated DCI transmitted in a PDCCH, or a group common message (e.g., DCI transmitted in a group common PDCCH). In another example, the signal indicating the AGC reference signal resource and/or the AGC reference signal configuration may be a broadcast message transmitted in a PBCH. In some aspects, the AGC reference signal configuration may include or indicate a mapping between different modulation coding scheme (MCS) values and a number of allocated AGC reference signal symbols. Based on the mapping, the UE may determine whether there is an allocated AGC reference signal, and/or a number of symbols are allocated for the AGC reference signal in the scheduled DL communication. In this regard, as explained above, the activation of the AGC reference signal for the scheduled DL communication may be based on the characteristics of the communications between the BS and the UE. In this regard, higher throughput MCSs may benefit from more rapid updating of the LNA gain state to accommodate rapid changes in interference.

In some aspects, the actions of block 1110 described above may be based on the duplexing mode of communication between the BS and the UE. For example, in some aspects, the BS is configured to transmit, and the UE is configured to receive, the AGC reference signal based on the scheduled DL communication being a full duplex (FD) communication. In another aspect, the BS is configured to transmit, and the UE is configured to receive, the AGC reference signal based on the scheduled DL communication being a half-duplex (HD) communication.

At block 1120, the UE receives, from the BS, the scheduled DL communication in the slot, where the scheduled DL communication includes the AGC reference signal in the indicated AGC reference signal resource. As explained above, the AGC reference signal resource includes at least the first symbol of the slot associated with the scheduled DL communication. However, the AGC reference signal may be transmitted in more than one symbol. For example, the scheduled DL communication may be transmitted by the BS in the slot, where the first one, two, or three symbols of the slot include the AGC reference signal. In some aspects, receiving the AGC reference signal in the AGC reference signal resource includes receiving a duplication or repeat of one or more of the symbols following the AGC reference signal. In another example, receiving the AGC reference signal includes receiving a reference signal associated with a known pilot, such as a channel state information reference signal (CSI-RS), phase tracking reference signal (PTRS), tracking reference signal (TRS), and/or demodulation reference signal (DMRS).

In some aspects, a single AGC reference signal may be received by the UE in each resource block. In other aspects, more than one AGC reference signal may be received in each resource block. In other aspects, a single AGC reference signal may be received for each carrier frequency. In other aspects, more than one AGC reference signal may be received for each carrier frequency. For example, the UE may receive an AGC reference signal in each subcarrier of each resource block. In some aspects, the AGC reference signal may be used by the UE to calculate received signal strength indicator (RSSI), reference signal received power (RSRP), and/or signal to noise ratio (SNR).

At block 1130, the UE performs, based on the AGC reference signal, an AGC for the scheduled DL communication. In some aspects, performing the AGC includes determining a RSSI value based on the AGC reference signal. Because the AGC reference signal is in the first symbol of the slot, the UE may be able to perform the AGC to update the gain state of the LNA in the analog front end for at least some of the remaining symbols in the slot including the DL communication. For example, if the AGC reference signal occupies only the first symbol of the slot, the UE may perform the AGC to update the LNA gain state to digitize/sample the second symbol and all other remaining symbols of the slot. In another example, if the UE is not configured with an LNA switch time capable of single-symbol gain state updating, the AGC reference signal may occupy the first two, three, four, or any other suitable number of symbols of the slot, where the symbols allocated for the AGC reference signal are contiguous and include the first symbol. The more frequent updating of the LNA gain state may reduce the probability that the LNA is saturated, and increases the probability that the LNA gain state has been correctly set or selected. Accordingly, the UE may more effectively digitize or sample the signals for the remaining symbols in the slot.

In some aspects, the indication of the AGC reference signal resource and the receiving the AGC reference signal in the scheduled DL communication may be based on a request from the UE. For example, the UE may request an AGC reference signal resource based on the MCS used by the UE and/or the BS for DL and/or UL communications. For example, the UE may be configured with a table indicating, for each MCS value, weather the UE should request an AGC reference signal resource, and/or a number of symbols for the AGC reference signal resource. In another example, the UE may transmit a request to the BS based on a level of mobility of the UE. For example, the UE may transmit, to the BS, a request for a AGC reference signal resource based on a mobility indicator (MI) associated with the UE. in some aspects, the UE may perform autonomous measurements to estimate the characteristics of dynamic clutter reflections, and transmit the request for the AGC reference signal resource based on the autonomous measurements.

In another aspect, the UE may receive the signal indicating the AGC reference signal resource based on the MI of the UE. For example, the UE may transmit, to the BS, And indication of the MI of the UE. Based on the MI, the BS may transmit the signal indicating the AGC reference signal resource. Transmitting the MI may include transmitting a RSRP report and/or a RSSI report. In some aspects, the signal indicating the AGC reference signal resource may be an implicit indication rather than an explicit indication. For example, receiving the signal indicating the AGC reference signal resource may include receiving control information indicating that the DL communication is a full duplex communication, half duplex communication, or any other type of duplexing. In other aspects, the implicit indication may include receiving control information indicating a MCS index for the DL communication.

Figure 12:
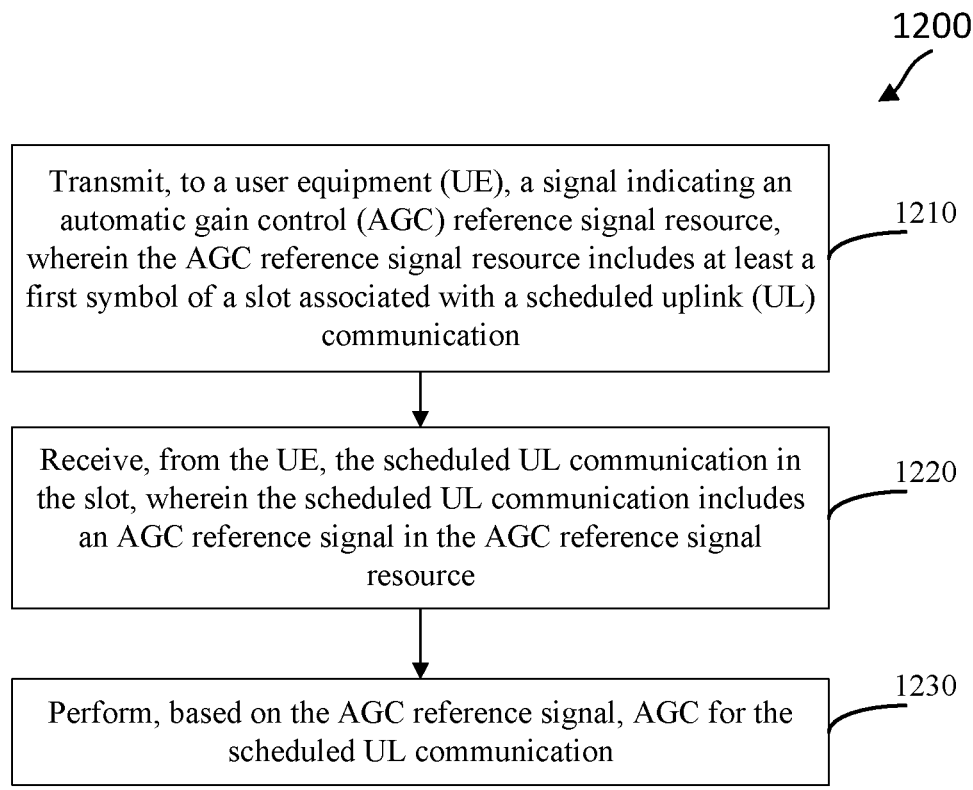
FIG. 12 illustrates a flow diagram of a wireless communication method, according to some aspects of the present disclosure.

FIG. 12 is a flow diagram of a wireless communication method 1200 according to some aspects of the present disclosure. Aspects of the method 1200 can be executed by a computing device (e.g., a processor, processing circuit, and/or other suitable component) of a wireless communication device or other suitable means for performing the steps. For example, a wireless communication device, such as the BSs 105 may utilize one or more components, such as the processor 902, the memory 904, the AGC reference signal module 908, the transceiver 910, the modem 912, and the one or more antennas 916, to execute the steps of method 1200. In some aspects, the method 1200 described below may include the BS transmitting, to a UE, a request or indication for the UE to transmit an AGC reference signal. Accordingly, the BS may use the received AGC reference signal to update a gain state of an LNA as similarly performed by the UE in the method 1100 described above. As illustrated, the method 1200 includes a number of enumerated steps, but aspects of the method 1200 may include additional steps before, after, and in between the enumerated steps. In some aspects, one or more of the enumerated steps may be omitted or performed in a different order.

At block 1210, a base station (BS) transmits, to a user equipment (UE), a signal indicating an automatic gain control (AGC) reference signal resource. The AGC reference signal resource includes at least a first symbol of a slot associated with a scheduled uplink (UL) communication. In some embodiments, transmitting the signal indicating the AGC reference signal resource includes transmitting downlink control information indicating the AGC reference signal resource. For example, the DCI may indicate an activation of the AGC reference signal resource. In some aspects, the DCI may further indicate the time and frequency resources associated with the scheduled UL communication. For example, the DCI may carry both the UL grant and the AGC reference signal resource activation. In some aspects, the DCI may indicate time and frequency resources associated with a PDSCH. In other aspects, transmitting the signal indicating the AGC reference signal resource includes transmitting a RRC message, a MAC information element, and/or a MAC-CE.

In some aspects, the AGC reference signal activation is associated with an AGC reference signal configuration. For example, the method 1200 may include the BS transmitting, to the UE, a first control signal indicating an AGC reference signal configuration. Block 1210 may include transmitting a second control signal indicating an activation of the AGC reference signal configuration. In some aspects, the first control signal may include an RRC message or RRC configuration. In other aspects, the first control signal may include a MAC information element and/or a MAC control element (MAC-CE). The AGC reference signal configuration may indicate the time and frequency resources for the AGC reference signal, including the first symbol of the slot associated with scheduled UL communication. For example, the AGC reference signal configuration may indicate a number of symbols allocated for the AGC reference signal. The number of symbols allocated for the AGC reference signal may be one, two, three, and/or any other suitable number of symbols. In some aspects, the AGC reference signal configuration may indicate other parameters or characteristics of the AGC reference signal, such as the type of signal. For example, the AGC reference signal configuration may indicate that the AGC reference signal is a copy or duplicate of the immediately-following symbol. In another example, the AGC reference signal configuration may indicate a pilot signal so that the AGC reference signal can be used by the BS for RSRP and/or SNR calculations. In some aspects, the AGC reference signal configuration may indicate a periodicity of the AGC reference signal. For example, the AGC reference signal configuration may indicate that an AGC reference signal resource will be allocated once every n slots. In another example, the AGC reference signal configuration may indicate that an AGC reference signal resource will be semi-persistently allocated. For example, the AGC reference signal configuration may indicate that a first AGC reference signal resource is allocated in a first slot, with x repetitions, and every y slots. In other aspects, the AGC reference signal configurations and/or signal characteristics may be preconfigured at the UE.

The signal transmitted at block 1110, and/or the AGC reference signal configuration, may be transmitted using dedicated or non-dedicated signaling. For example, the signal indicating the AGC reference signal resource may be a dedicated DCI transmitted in a PDCCH, or a group common message (e.g., DCI transmitted in a group common PDCCH). In another example, the signal indicating the AGC reference signal resource and/or the AGC reference signal configuration may be a broadcast message transmitted in a PBCH. In some aspects, the AGC reference signal configuration may include or indicate a mapping between different modulation coding scheme (MCS) values and a number of allocated AGC reference signal symbols. Based on the mapping, the UE may determine whether there is an allocated AGC reference signal, and/or a number of symbols are allocated for the AGC reference signal in the scheduled DL communication. In this regard, as explained above, the activation of the AGC reference signal for the scheduled DL communication may be based on the characteristics of the communications between the BS and the UE. In this regard, higher throughput MCSs may benefit from more rapid updating of the LNA gain state to accommodate rapid changes in interference.

In some aspects, the actions of block 1210 described above may be based on the duplexing mode of communication between the BS and the UE. For example, in some aspects, the BS is configured to transmit, and the UE is configured to receive, the AGC reference signal resource indication based on the scheduled UL communication being a full duplex (FD) communication. In another aspect, the BS is configured to transmit, and the UE is configured to receive, the AGC reference signal resource indication based on the scheduled UL communication being a half-duplex (HD) communication.

At block 1220, the BS receives, from the UE, the scheduled UL communication in the slot, where the scheduled UL communication includes the AGC reference signal in the indicated AGC reference signal resource. As explained above, the AGC reference signal resource includes at least the first symbol of the slot associated with the scheduled UL communication. However, the AGC reference signal may be received in more than one symbol, in some aspects. For example, the scheduled UL communication may be transmitted by the UE in the slot, where the first one, two, or three symbols of the slot include the AGC reference signal. In some aspects, receiving the AGC reference signal in the AGC reference signal resource includes receiving a duplication or repeat of one or more of the symbols following the AGC reference signal. In another example, receiving the AGC reference signal includes receiving a reference signal associated with a known pilot, such as a channel state information reference signal (CSI-RS), phase tracking reference signal (PTRS), tracking reference signal (TRS), and/or demodulation reference signal (DMRS).

In some aspects, a single AGC reference signal may be received by the BS in each resource block. In other aspects, more than one AGC reference signal may be received in each resource block. In other aspects, a single AGC reference signal may be received for each carrier frequency. In other aspects, more than one AGC reference signal may be received for each carrier frequency. For example, the BS may receive an AGC reference signal in each subcarrier of each resource block. In some aspects, the AGC reference signal may be used by the BS to calculate received signal strength indicator (RSSI), reference signal received power (RSRP), and/or signal to noise ratio (SNR).

At block 1230, the BS performs, based on the AGC reference signal, an AGC for the scheduled UL communication. In some aspects, performing the AGC includes determining a RSSI value based on the AGC reference signal. Because the AGC reference signal is in the first symbol of the slot, the BS may be able to perform the AGC to update the gain state of the LNA in the analog front end for at least some of the remaining symbols in the slot including the UL communication. For example, if the AGC reference signal occupies only the first symbol of the slot, the BS may perform the AGC to update the LNA gain state to digitize/sample the second symbol and all other remaining symbols of the slot. In another example, if the BS is not configured with an LNA switch time capable of single-symbol gain state updating, the AGC reference signal may occupy the first two, three, four, or any other suitable number of symbols of the slot, where the symbols allocated for the AGC reference signal are contiguous and include the first symbol. The more frequent updating of the LNA gain state may reduce the probability that the LNA is saturated, and increases the probability that the LNA gain state has been correctly set or selected. Accordingly, the BS may more effectively digitize or digitally sample the signals for the remaining symbols in the slot.

In some aspects, the transmitting the AGC reference signal resource indication comprises transmitting a request for the UE to transmit the AGC reference signal in the indicated AGC reference signal resource. For example, the BS may request an AGC reference signal resource based on the MCS used by the UE and/or the BS for DL and/or UL communications. For example, the BS may be configured with a table indicating, for each MCS value, weather the BS should request an AGC reference signal, and/or a number of symbols for the AGC reference signal resource.

In another aspect, the BS may request the AGC reference signal resource based on the MI of the UE. For example, the UE may transmit, to the BS, an indication of the MI of the UE. Based on the MI, the BS may transmit the signal indicating the AGC reference signal resource.

Recitations of Some Aspects of the Present Disclosure

Aspect 1. A method of wireless communication performed by a user equipment (UE), the method comprising: receiving, from a base station (BS), a signal indicating an automatic gain control (AGC) reference signal resource, wherein the AGC reference signal resource includes at least a first symbol of a slot associated with a scheduled downlink (DL) communication; receiving, from the BS, the scheduled DL communication in the slot, wherein the scheduled DL communication includes an AGC reference signal in the AGC reference signal resource; and performing, based on the AGC reference signal, AGC for the scheduled DL communication.

Aspect 2. The method of aspect 1, wherein the receiving the signal indicating the AGC comprises receiving downlink control information (DCI) indicating the AGC reference signal resource.

Aspect 3. The method of aspect 2, wherein the DCI further indicates time and frequency resources associated with the scheduled DL communication.

Aspect 4. The method of any of aspects 1-3, further comprising: receiving, from the BS, a first control signal indicating an AGC reference signal configuration, wherein the receiving the signal indicating the AGC reference signal resource comprises receiving a second control signal activating the AGC reference signal configuration.

Aspect 5. The method of any of aspects 1-4, wherein the scheduled DL communication comprises a full duplex (FD) DL communication, and wherein the receiving the signal indicating the AGC reference signal resource comprises receiving downlink control information (DCI) indicating the FD DL communication.

Aspect 6. The method of any of aspects 1-4, wherein the scheduled DL communication comprises a half-duplex (HD) DL communication, and wherein the receiving the signal indicating the AGC reference signal resource comprises receiving downlink control information (DCI) indicating the HD DL communication.

Aspect 7. The method of any of aspects 1-6, wherein the slot comprises the first symbol and a plurality of remaining symbols, and wherein the performing the AGC comprises performing the AGC for the plurality of remaining symbols of the slot.

Aspect 8. The method of any of aspects 1-7, wherein the AGC reference signal resource comprises the first symbol and at least a second symbol of the slot, wherein the second symbol is contiguous with the first symbol.

Aspect 9. The method of any of aspects 1-8, further comprising: updating, based on the AGC, a low-noise amplifier (LNA) gain state.

Aspect 10. The method of aspect 9, further comprising: digitally sampling, based on the updated LNA gain state, data signals in the slot.

Aspect 11. The method of any of aspects 1-10, further comprising: transmitting, to the BS, a request for the AGC reference signal resource.

Aspect 12. The method of aspect 11, wherein the request is based on a modulation coding scheme (MCS) for the scheduled DL communication.

Aspect 13. The method of aspect 11, wherein the request is based on a mobility indicator (MI)-based cross link interference (CLI) report associated with the UE.

Aspect 14. The method of aspect 1, further comprising: transmitting, to the BS, a mobility indicator (MI), wherein the AGC reference signal is based on the MI.

Aspect 15. A method for wireless communication performed by abase station (BS), the method comprising: transmitting, to a user equipment (UE), a signal indicating an automatic gain control (AGC) reference signal resource, wherein the AGC reference signal resource includes at least a first symbol of a slot associated with a scheduled uplink (UL) communication; receiving, from the UE, the scheduled UL communication in the slot, wherein the scheduled UL communication includes an AGC reference signal in the AGC reference signal resource; and performing, based on the AGC reference signal, AGC for the scheduled UL communication.

Aspect 16. The method of aspect 15, wherein the transmitting the signal indicating the AGC comprises transmitting downlink control information (DCI) indicating the AGC reference signal resource.

Aspect 17. The method of aspect 16, wherein the DCI further indicates time and frequency resources associated with the scheduled UL communication.

Aspect 18. The method of any of aspects 15-17, further comprising: transmitting, to the UE, a first control signal indicating an AGC reference signal configuration, wherein the transmitting the signal indicating the AGC reference signal resource comprises transmitting a second control signal activating the AGC reference signal configuration.

Aspect 19. The method of any of aspects 15-18, wherein the scheduled UL communication comprises a full duplex (FD) UL communication, and wherein the transmitting the signal indicating the AGC reference signal resource comprises transmitting downlink control information (DCI) indicating the FD UL communication.

Aspect 20. The method of any of aspects 15-18, wherein the scheduled UL communication comprises a half-duplex (HD) UL communication, and wherein the transmitting the signal indicating the AGC reference signal resource comprises transmitting downlink control information (DCI) indicating the HD UL communication.

Aspect 21. A user equipment (UE) comprising: a transceiver; and a processor in communication with the transceiver such that the transceiver and the processor are configured to perform the actions of any of aspects 1-14.

Aspect 22. A base station (BS) comprising: a transceiver; and a processor in communication with the transceiver such that the transceiver and the processor are configured to perform the actions of any of aspects 15-20.

Aspect 23. A non-transitory, computer-readable medium having program code recorded thereon, wherein the program code comprises instructions executable by a processor of a user equipment (UE) to perform the actions of any of aspects 1-14.

Aspect 24. A non-transitory, computer-readable medium having program code recorded thereon, wherein the program code comprises instructions executable by a processor of a base station (BS) to perform the actions of any of aspects 15-20.

Aspect 25. A user equipment (UE) comprising means for performing the steps of any of aspects 1-14.

Aspect 26. A base station (BS) comprising means for performing the steps of any of aspects 15-20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of wireless communication performed by a user equipment (UE), the method comprising:
   receiving, from a base station (BS), a signal indicating an automatic gain control (AGC) reference signal resource, wherein the AGC reference signal resource includes at least a first symbol of a slot associated with a scheduled downlink (DL) communication;
   receiving, from the BS, the scheduled DL communication in the slot, wherein the scheduled DL communication includes an AGC reference signal in the AGC reference signal resource;
   performing, based on the AGC reference signal, AGC for the scheduled DL communication; and
   updating, based on the performing the AGC, a low-noise amplifier (LNA) gain state.

2. The method of claim 1, wherein the receiving the signal indicating the AGC comprises receiving downlink control information (DCI) indicating the AGC reference signal resource.

3. The method of claim 2, wherein the DCI further indicates time and frequency resources associated with the scheduled DL communication.

4. The method of claim 1, further comprising:
   receiving, from the BS, a first control signal indicating an AGC reference signal configuration,
   wherein the receiving the signal indicating the AGC reference signal resource comprises receiving a second control signal activating the AGC reference signal configuration.

5. The method of claim 1, wherein the scheduled DL communication comprises a full duplex (FD) DL communication, and wherein the receiving the signal indicating the AGC reference signal resource comprises receiving downlink control information (DCI) indicating the FD DL communication.

6. The method of claim 1, wherein the scheduled DL communication comprises a half-duplex (HD) DL communication, and wherein the receiving the signal indicating the AGC reference signal resource comprises receiving downlink control information (DCI) indicating the HD DL communication.

7. The method of claim 1, wherein the slot comprises the first symbol and a plurality of remaining symbols, and wherein the performing the AGC comprises performing the AGC for the plurality of remaining symbols of the slot.

8. The method of claim 1, wherein the AGC reference signal resource comprises the first symbol and at least a second symbol of the slot, wherein the second symbol is contiguous with the first symbol.

9. The method of claim 1, further comprising:
   digitally sampling, based on the updated LNA gain state, data signals in the slot.

10. The method of claim 1, further comprising:
    transmitting, to the BS, a request for the AGC reference signal resource.

11. The method of claim 10, wherein the request is based on a modulation coding scheme (MCS) for the scheduled DL communication.

12. The method of claim 10, wherein the request is based on a mobility indicator (MI)-based cross link interference (CLI) report associated with the UE.

13. The method of claim 1, further comprising:
transmitting, to the BS, a mobility indicator (MI), wherein the AGC reference signal is based on the MI.

14. A method for wireless communication performed by a base station (BS), the method comprising:
transmitting, to a user equipment (UE), a signal indicating an automatic gain control (AGC) reference signal resource, wherein the AGC reference signal resource includes at least a first symbol of a slot associated with a scheduled uplink (UL) communication;
receiving, from the UE, the scheduled UL communication in the slot, wherein the scheduled UL communication includes an AGC reference signal in the AGC reference signal resource;
performing, based on the AGC reference signal, AGC for the scheduled UL communication; and
updating, based on the performing the AGC, a low-noise amplifier (LNA) gain state.

15. The method of claim 14, wherein the transmitting the signal indicating the AGC comprises transmitting downlink control information (DCI) indicating the AGC reference signal resource.

16. The method of claim 15, wherein the DCI further indicates time and frequency resources associated with the scheduled UL communication.

17. The method of claim 14, further comprising:
transmitting, to the UE, a first control signal indicating an AGC reference signal configuration,
wherein the transmitting the signal indicating the AGC reference signal resource comprises transmitting a second control signal activating the AGC reference signal configuration.

18. The method of claim 14, wherein the scheduled UL communication comprises a full duplex (FD) UL communication, and wherein the transmitting the signal indicating the AGC reference signal resource comprises transmitting downlink control information (DCI) indicating the FD UL communication.

19. The method of claim 14, wherein the scheduled UL communication comprises a half-duplex (HD) UL communication, and wherein the transmitting the signal indicating the AGC reference signal resource comprises transmitting downlink control information (DCI) indicating the HD UL communication.

20. A user equipment (UE), comprising:
one or more transceivers; and
one or more processors in communication with the one or more transceivers such that the UE is configured to:
receive, from a base station (BS), a signal indicating an automatic gain control (AGC) reference signal resource, wherein the AGC reference signal resource includes at least a first symbol of a slot associated with a scheduled downlink (DL) communication;
receive, from the BS, the scheduled DL communication in the slot, wherein the scheduled DL communication includes an AGC reference signal in the AGC reference signal resource;
perform, based on the AGC reference signal, AGC for the scheduled DL communication; and
update, based on the AGC, a low-noise amplifier (LNA) gain state.

21. The UE of claim 20, wherein the UE is further configured to receive downlink control information (DCI) indicating the AGC reference signal resource.

22. The UE of claim 20, wherein the UE is further configured to:
receive, from the BS, a first control signal indicating an AGC reference signal configuration; and
receive a second control signal activating the AGC reference signal configuration.

23. The UE of claim 20, wherein the slot comprises the first symbol and a plurality of remaining symbols, and wherein the transceiver and the processor are configured to perform the AGC for the plurality of remaining symbols of the slot.

24. The UE of claim 20, wherein the AGC reference signal resource comprises the first symbol and at least a second symbol of the slot, wherein the second symbol is contiguous with the first symbol.

25. The UE of claim 20, wherein the UE is further configured to:
transmit, to the BS, a request for the AGC reference signal resource.

26. A base station (BS), comprising:
one or more transceivers; and
one or more processors in communication with the one or more transceivers such that the BS is configured to:
transmit, to a user equipment (UE), a signal indicating an automatic gain control (AGC) reference signal resource, wherein the AGC reference signal resource includes at least a first symbol of a slot associated with a scheduled uplink (UL) communication;
receive, from the UE, the scheduled UL communication in the slot, wherein the scheduled UL communication includes an AGC reference signal in the AGC reference signal resource;
perform, based on the AGC reference signal, AGC for the scheduled UL communication; and
update, based on the AGC, a low-noise amplifier (LNA) gain state.

27. The BS of claim 26, wherein the BS is further configured to transmit downlink control information (DCI) indicating the AGC reference signal resource.

28. The BS of claim 27, wherein the DCI further indicates time and frequency resources associated with the scheduled UL communication.

29. The BS of claim 26, wherein the BS is further configured to:
transmit, to the UE, a first control signal indicating an AGC reference signal configuration; and
transmit a second control signal activating the AGC reference signal configuration.

* * * * *